(12) United States Patent
Weber et al.

(10) Patent No.: US 7,979,336 B2
(45) Date of Patent: *Jul. 12, 2011

(54) SYSTEM FOR PRICING FINANCIAL INSTRUMENTS

(75) Inventors: Clifford J. Weber, Basking Ridge, NJ (US); Carol Alexander, Purley Surrey (GB); Charles A. Baker, Wayne, PA (US); Jason MacQueen, New York, NY (US); Gary L. Gastineau, Short Hills, NJ (US); Terry Norman, Barling Magna (GB)

(73) Assignee: Nyse Amex LLC, New York, NY (US)

( * ) Notice: Subject to any disclaimer, the term of this patent is extended or adjusted under 35 U.S.C. 154(b) by 602 days.

This patent is subject to a terminal disclaimer.

(21) Appl. No.: 12/072,417

(22) Filed: Feb. 25, 2008

(65) Prior Publication Data

US 2008/0177676 A1    Jul. 24, 2008

Related U.S. Application Data

(60) Continuation-in-part of application No. 11/986,390, filed on Nov. 20, 2007, now Pat. No. 7,526,445, which is a division of application No. 10/123,779, filed on Apr. 16, 2002, now Pat. No. 7,305,362.

(30) Foreign Application Priority Data

Mar. 18, 2002 (GB) .................................. 0206440.0

(51) Int. Cl.
*G06Q 40/00* (2006.01)
(52) U.S. Cl. ......................... 705/36 R; 705/35; 705/37

(58) Field of Classification Search ............... 705/35–37
See application file for complete search history.

(56) References Cited

U.S. PATENT DOCUMENTS 5,121,337 A    6/1992    Brown
(Continued)

FOREIGN PATENT DOCUMENTS

EP    0 434 877    7/1991
(Continued)

OTHER PUBLICATIONS

Gopikrishnan et al., "Quantifying and interpreting collective behavior in financial markets," Physical Review E, vol. 64, pp. 35106-1-35106-4 (Aug. 30, 2001).*

(Continued)

*Primary Examiner* — Hani Kazimi
*Assistant Examiner* — Abhishek Vyas
(74) *Attorney, Agent, or Firm* — Buckley, Maschoff & Talwalkar LLC

(57) ABSTRACT

A method of determining an estimate of the market value of a traded unit of a financial instrument, and apparatus for carrying out the method, said instrument comprising a fund of individually priced securities and the exact composition of said fund being withheld from the market, said method comprising selecting a plurality of mutually independent risk factors, each risk factor being representative of market behaviour estimated to be significant to the price behaviour of the traded unit, obtaining information from a third party holding information regarding the composition of said fund regarding the actual significance of said risk factors to the value of said traded unit, and calculating a value for said traded unit on the basis of said significances.

18 Claims, 17 Drawing Sheets

U.S. PATENT DOCUMENTS

| | | | |
|---|---|---|---|
| 5,214,579 | A | 5/1993 | Wolfberg et al. |
| 5,658,423 | A | 8/1997 | Angell et al. |
| 5,765,165 | A | 6/1998 | Harper |
| 5,799,287 | A * | 8/1998 | Dembo ............... 705/36 R |
| 5,806,048 | A | 9/1998 | Kiron et al. |
| 5,873,071 | A | 2/1999 | Ferstenberg et al. |
| 5,875,437 | A | 2/1999 | Atkins |
| 5,930,762 | A * | 7/1999 | Masch ............... 705/7 |
| 5,937,159 | A | 8/1999 | Meyers et al. |
| 5,987,435 | A | 11/1999 | Weiss et al. |
| 6,003,018 | A * | 12/1999 | Michaud et al. ............ 705/36 R |
| 6,047,270 | A | 4/2000 | Joao et al. |
| 6,061,662 | A | 5/2000 | Makivic |
| 6,061,663 | A | 5/2000 | Bloom et al. |
| 6,088,685 | A | 7/2000 | Kiron et al. |
| 6,108,648 | A | 8/2000 | Lakshmi et al. |
| 6,111,255 | A | 8/2000 | Malins |
| 6,205,439 | B1 | 3/2001 | Gardner |
| 6,244,986 | B1 | 6/2001 | Mori et al. |
| 6,275,814 | B1 * | 8/2001 | Giansante et al. .......... 705/36 R |
| 6,304,858 | B1 | 10/2001 | Mosler et al. |
| 6,317,728 | B1 | 11/2001 | Kane |
| 6,321,212 | B1 | 11/2001 | Lange |
| 6,360,210 | B1 | 3/2002 | Wallman |
| 6,377,907 | B1 | 4/2002 | Waclawski |
| 6,456,982 | B1 | 9/2002 | Pilipovic |
| 6,584,502 | B1 | 6/2003 | Natarajan et al. |
| 6,606,615 | B1 | 8/2003 | Jennings et al. |
| 6,832,210 | B1 | 12/2004 | Li |
| 7,085,738 | B2 | 8/2006 | Tarrant |
| 7,103,569 | B1 | 9/2006 | Groveman et al. |
| 7,349,878 | B1 * | 3/2008 | Makivic ............... 705/37 |
| 7,526,445 | B2 * | 4/2009 | MacQueen et al. ......... 705/36 R |
| 2002/0007329 | A1 | 1/2002 | Alcaly et al. |
| 2002/0091616 | A1 | 7/2002 | Bloom et al. |
| 2002/0099640 | A1 | 7/2002 | Lange |
| 2002/0120542 | A1 | 8/2002 | Higgins |
| 2002/0178111 | A1 * | 11/2002 | Woodley ............... 705/38 |
| 2002/0184126 | A1 | 12/2002 | McIntyre, Jr. et al. |
| 2003/0014343 | A1 | 1/2003 | Jones |
| 2003/0065602 | A1 | 4/2003 | Yip |
| 2003/0126062 | A1 | 7/2003 | Gilbert et al. |
| 2003/0139993 | A1 | 7/2003 | Feuerverger |
| 2003/0144947 | A1 * | 7/2003 | Payne ............... 705/37 |
| 2003/0177084 | A1 | 9/2003 | Cassani et al. |
| 2004/0044505 | A1 | 3/2004 | Horwitz |
| 2004/0049448 | A1 | 3/2004 | Glickman |
| 2004/0059621 | A1 | 3/2004 | Jameson |
| 2004/0215551 | A1 | 10/2004 | Eder |
| 2005/0027634 | A1 | 2/2005 | Gershon |
| 2005/0108134 | A1 | 5/2005 | Harlow et al. |

FOREIGN PATENT DOCUMENTS

| | | |
|---|---|---|
| WO | WO 96/18963 | 6/1996 |
| WO | WO 01/03046 | 11/2001 |
| WO | WO 02/084435 | 10/2002 |
| WO | WO 02/091109 | 11/2002 |
| WO | WO 03/001325 | 3/2003 |
| WO | WO 03/036533 | 5/2003 |
| WO | WO 03/083616 | 10/2003 |

OTHER PUBLICATIONS

"Hedge Fund Returns: You Can Make Them Yourself!" Kat, H.M., Palaro, H.P., Fall 2005.

"Hedge Fund Benchmarks, A Risk-Based Approach," Fung, W, Hsieh D. A., Financial Analysts Journal: Sep./ Oct. 2004; 60, 5; ProQuest Central, p. 65.

"Understanding Mutual Fund and Hedge Fund Styles Using Return Based Style Analysis," Dor, A. B., Jagannathan, R., Nat'l Bureau of Economic Research, Aug. 2002.

"Asset Allocation: Measurement Style and Performance Measurement," Sharpe, W. F., Journal of Portfolio Management, Winter 1992, pp. 7-19.

"Scenario Optimization," Dembo, R. S., Annals of Operations Research, 30 (1991), pp. 63-80.

"New Exchange Funds: Not Just Spiders and WEBS," Tergesen, A., Business Week, Nov. 15, 1999.

"Investing; AMEX Considers Mutual Fund Trading," Robinson, S., NYT, Sep. 19, 1999.

"Tracking Models and the Optimal Regret Distribution in Asset Allocation," Dembo, R. S., King, A. J., Applied Stochastic Models and Data Analysis, vol. 8, 151-157, 1992.

"Testing Asset Pricing Models with Changing Expectations and an Unobservable Market Portfolio," Gibbons, M. R., Ferson, W., Journal of Financial Economics, 14 (1985), pp. 217-.

"The Arbitrage Pricing Theory and Multifactor Models of Asset Returns," Gregory Connor et al., Sep. 1992, Forthcoming in *Finance Handbook*, pp. 1-94.

"A Test for the Number of Factors in an Approximate Factor Model," *Journal of Finance 48*, (1993), pp. 1263-1292.

"A Test of the Multi-Factor Asset Pricing Model with the ASA-NBER Macroeconomic Forecasts;" Cheong; *Dissertation*, State University of New York at Albany, 1988.

"Active ETF Inching Toward Reality," T. Leswing, Ignites.com, Jun. 10, 2004.

"Actively Managed ETFs on Horizon," I. Clary, Securities Industry News, Jun. 28, 2004, Copyright © Thomson Media Inc.

"An Exploratory Investigation of the Finn Size Effect," Chen et al., *Journal of Financial Economics 14* (1985), pp. 451-471.

"Blind Bids Become Popular in Big Trades," Grep Ip, *Wall Street Journal*, Aug. 14, 1997.

"Common Factors in Security Returns: Microeconomic Determinants and Macroeconomic Correlates," by Barr Rosenberg et al., Institute of Business and Economic Research, University of California, Berkeley, Working Paper No. 44, May 13-14, 1976, pp. 1-55.

"Common Principal Components and Related Multivariate Models," Bernhard Flury, *Department of Mathematics, Indiana University*, Bloomington, Indiana, Copyright 1988 by John Wiley & Sons, Inc.; pp. 1-258.

"Common Risk Factors in the Returns of Stocks and Bonds," E.F. Fama et al., *Journal of Financial Economists 33* (1993), pp. 3-56.

"Could Exchange Traded Funds Be Right for You?," Ameritrade; Ameritrade Exchange-Traded Funds-ETF Center, pp. 1-2, 2004.

"Explore the Essentials of ETFs," Ameritrade; Ameritrade Exchange-Traded Funds-ETF Center: Education; pp. 1-4, 2004.

"Extra-Market Components of Covariance in Security Returns," B.A. Rosenberg, *Journal of Financial and Quantitative Analysis 9* (1973), pp. 263-274.

"Extra-Market Components of Covariance Among Security Prices," B.A. Rosenberg et al., University of California, Berkeley, Research Program in Finance, Working Paper RPF-013, pp. 1-45, 1973.

"Factor Analysis and Principal Components," by Hans Schneeweiss et al., *Journal of Multivariate Analysis*, vol. 55, pp. 105-124 (1995).

"Getting Personal: Active ETF Filing May Be on Horizon," T Bernard, Dow Jones News Service, Jun. 23, 2004.

"HCM Global Technology Fund Limited: Investment Statement," available at www.Fantasy.co.nz/brokerage/hcm/tech-is.pdf (available on or after Jun. 1, 1999).

"Industry Factors versus Other Factors in Risk Prediction," Jivendra K. Kale et al., Research Program in Finance, Working Paper Series, University of California, Berkeley (Mar. 1991). pp. 1-22.

"International Portfolio Diversification: A Multivariate Analysis for a Group of Latin American Countries," Donald R. Lessard, *The Journal of Finance*, vol. 28, No. 3 (Jun. 1973), pp. 619-633.

MAR Headlines: In Business "Mopex ups ante in ETF patent challenge," Last visited on Apr. 25, 2002.

"Market Models: A Guide to Financial Data Analysis," C. Alexander, Wileys, 2001, pp. 143-178.

"Mimicking Portfolios and Exact Arbitrage Pricing," Gur Huberman et al., *The Journal of Finance*, vol. 42, No. 1 (Mar. 1987), pp. 1-9.

"Modern Portfolio Theory;" Elton et al.; 1950 to date *Journal of Banking & Finance*, vol. 21, issues 11-12, Dec. 1997; pp. 1743-1759.

"Mutual Fund Performance Evaluation: a Comparison of Benchmark and Benchmark Comparison;" Lehman et al.; *Journal of Finance*, Vo. 2, No. 2, Jun. 1987, pp. 235-238.

"On Lines and Planes of Closest Fit to Systems of Points of Space," K. Pearson, *Philosophical Magazine and Journal of Science*, vol. 2, Sixth Series, Jul.-Dec. 1901, pp. 559-572.

"Principal Blind Bidding in Portfolio Trading," *Traders*, No. 143, vol. 11; p. NA; ISSN: 0894-7295, Sep. 1998, pp. 1-3.

"Quantifying and interpreting collective behavior in financial markets," Gopikrishnan et al., *Physical Review E*, vol. 64, pp. 1-4, 2001.

[Random-bits] Gregory Aharonian on Open end mutual fund securitization process patent; pp. 1-4; last visited Apr. 25, 2002.

"Risk and Return in an Equilibrium Apt," Gregory Connor et al., *Journal of Financial Economics*, 21 *1988) 255-289. North-Holland.

"Science and Technology: Digital Rights and Wrongs," *The Economist*, pp. 75-76, Jul. 17, 1999.

"SEC Concept Release: Actively Managed Exchange-Trade Funds," U.S. Securities and Exchange Commission, http://www.sec.gov/rules/concept/it-25258.htm; last visited on Aug. 24, 2004.

"Sorting Out Risks Using Known APT Factors," M.A. Berry et al., *Financial Analysts Journal* (Mar.-Apr. 1988), pp. 29-42.

"Sources of Over-Performance in Equity Markets: Mean Reversion, Common Trends and Herding," Carol Alexander et al., *ISMA Centre Discussion Papers in Finance DP2003-08*, Oct. 2003, pp. 3-31.

"Stock Market Indices: A Principal Components Analysis," Feeney; Cowles Foundation for Research in Economics at Yale University, Monograph 19, pp. 110-138.

"The Empirical Foundation of the Arbitrage Pricing Theory," B. Lehman et al., *Journal of Financial Economics 21* (1988), pp. 213-254.

"The Relative Importance of Common Factors Across the European Equity Markets," S. Beckers et al., *Journal of Banking and Finance 16* (1992), pp. 75-97.

"The Risk and Return from Factors," Louis K. C. Chan et al., *The Journal of Financial and Quantitative Analysis*, vol. 33, No. 2 (Jun. 1998). pp. 159-188.

"The Three Types of Factor Models: A Comparison of Their Explanatory Power," Gregory Connor, pp. 1-7.

"What's Next for ETFs," Gregg Greenberg, The Street.com, pp. 1-2.

"New Products: Amex plans active exchange-traded fund;" Greene, A.; Aug. 21, 2000, *Investment Management Weekly*, New York, p. 1.

"Vanguard SEC Exemptive Application" dated Jul. 12, 2000; pp. 1-88.

Principal Component Estimators in Regression Analysis, Cheng, D.C. and Iglarsh, H.J., The Review of Economics and Statistics, 58(2), May 1976, pp. 229-234.

On Portfolio Optimization: Forecasting Covariances and Choosing the Risk Mode, Chan, L. et al., The Review of Financial Studies, 12(5), Winter 1999, pp. 937-974.

* cited by examiner

SYSTEM FOR PRICING FINANCIAL INSTRUMENTS

RELATION TO OTHER APPLICATIONS

This application is a CONTINUATION of the U.S. patent application Ser. No. 11/986,390, filed Nov. 20, 2007, which is a DIVISIONAL of U.S. patent application Ser. No. 10/123,779, filed Apr. 16, 2002, now U.S. Pat. No. 7,305,362, issued Dec. 4, 2007, which claims priority to U.K. Application No. 0206440.0 filed on Mar. 18, 2002.

This relates to a system for pricing financial instruments, and is particularly but not exclusively concerned with the pricing of instruments the nature and content of which is either completely or partially obscured to specialists, market makers, traders and investors.

Recently, the Securities and Exchange Commission, the leading financial services regulatory body in the United States of America, has identified a commercial interest in the provision of a regulatory environment suitable for the creation of financial instruments described as "actively managed exchange traded funds".

Exchange traded funds have been in existence on many financial markets for some time, the most notable example being index tracking funds. These funds consist of baskets of financial instruments, such as shares, future contracts or other traded securities. Units based on these funds can be bought and sold on an appropriate market. The exact composition of index tracking funds is designed to ensure that the overall aggregate value of the assets held in the fund is representative of and varies in accordance with an external indicator, such as a stock market index.

These funds are therefore managed in accordance with right constraints, which ensure that the investor is protected from behaviour that is significantly divergent from the index that the investor has chosen to follow.

In many circumstances, there funds are currently managed by computerised means, as this can be a convenient way of rapidly controlling the structure and composition of a fund to react to changes in circumstances of a financial index, such as a change in the 'basket' of shares from which a stock market performance index is calculated.

Further, in the past, to ensure transparency, managers of exchange traded funds have been obliged by regulators to make available to the public details of the assets held in those funds. This has precluded the development of exchange traded funds which are actively managed by a fund manager experienced in managing assets on the basis of his knowledge of the market so that, through the expertise of the fund manager, the aggregate value of the assets of a fund can grow faster than the prevailing market rate. These funds would be advantageous over the more passively managed funds described above, as there is the prospect of growth over market trend, which would lead to the funds being considered more suitable for high growth investment.

The reason that there has been no incentive for fund managers to develop actively managed funds is that the obligation imposed by financial regulators to disclose asset holdings, on which exchange traded funds are based, would destroy any advantage that expert fund managers would have over private and other institutional investors with their own portfolios of stocks and other traded assets. Such investors would be able to follow the trading behaviour of an expert fund manager, to take advantage of the same rises and falls in asset values to gain growth in an investment over the prevailing market trend, without having invested in the traded find and thus paid a transaction charge to the fund manager for the benefit of his expertise. This phenomenon is known as free loading, and is unavoidable unless information relating to the composition of a traded fund is withheld from the market participants who would be expected to trade in units of the exchange traded fund.

Now, regulatory bodies are considering allowing exemptions on the requirement to disclose asset holdings, which is a step essential to the development of actively managed exchange traded funds. A briefing release, "Actively Managed Exchange Traded Funds" (Release no. IC-25258; File no. S7-20-01), describes the commercial limitations of traditional, passively managed exchange traded funds, and notes the advantages of the proposed actively managed versions, together with the existing regulatory limitations which have prevented the creation of such funds to date.

Thus, financial instruments based on actively managed exchange traded funds are likely to be introduced in the near future. As such, there is a technical need to prepare for this, by providing systems capable of managing such instruments, and methods of determining information suitable to support the trade and hedging in such instruments.

A feature of managing such instruments is that the market must be capable of setting an accurate price for an instrument, so that traders can set bid-ask spreads within a normal range. Since the composition of the instrument, in terms of proportion of individual stocks and other assets, will not be known precisely by a market maker or specialist, as persons appointed in a market to maintain orderly trade are variously known, there will be no way of determining the price of the instrument by aggregating the value of securities held in the fund.

It is therefore an object of an aspect of the present invention to provide means to allow pricing of a financial instrument where information which would normally allow pricing e.g. through arbitrage, is not completely available.

Another consequence of the market participants' lack of knowledge of the exact composition of the fund is that market maker/specialists, who supervise trading in a financial instrument by matching, as far as possible, buy orders and sell orders to maintain an orderly market, will not have sufficient information to enable them to hedge their exposure to risk. Risk can arise through the fact that, in order to maintain an orderly market, a market maker/specialist may be required to take a trading position contrary to the prevailing condition of the market (i.e. to increase holdings in certain instruments when others on the market are selling). This contrary position will leave the market maker/specialist exposed to the risk of movements in the values of component instruments in which he has taken a contrary position.

Normally, a market maker (or specialist) would reduce this risk by hedging. Hedging can be achieved by trade in futures (contracts to buy or sell particular securities, commodities or financial instruments at agreed prices at a time in the future) or particularly liquid securities. However, because the market maker/specialist is not party to the exact content of an actively managed exchange traded fund, the market maker cannot identify appropriate hedging investments to hedge his trading position against price variations.

Therefore it is an object of another aspect of the invention that a means be provided to generate information which will aid a market maker/specialist in hedging against a financial instrument where the composition of the instrument is not known.

US Patent Application US2001/0025266A1, in the name of The American Stock Exchange, LLC, describes the above-mentioned approach to actively managed exchange traded funds. It also sets out the principles of a system for pricing a fund, and identifies the need for information which will enable a market maker to model the behaviour of a fund by assembling a 'basket' of securities selected to mimic the expected behaviour of the fund on the basis of recent experience.

However, US2001/0025266A1 does not describe a way of determining factors required to model the behaviour of the fund. This presents a problem, in that there is no evident method of characterising a fund, such that the likely future behaviour of the fund can be modelled. Thus, a need is perceived for a system, and a method, for establishing a profile of a fund from responses, given by a knowledgeable party, to enquiries, the information requested being sufficient to provide adequate information for pricing and hedging, but not so much that the confidentiality of the composition of the traded fund concerned is compromised.

Therefore, according to a first aspect of the invention, a method of determining an estimate of a price of a financial instrument, comprising a unit of a fund of assets selected from a defined set of such assets, includes the steps of assembling data describing the behaviour of the value of the fund and the assets in said set over a period of time, detecting correlation between values of certain combinations of said assets in said set, assembling combinations of said assets with desirably low cross correlation, ascertaining, from a party with knowledge of the composition of said fund, the exposure of said fund to said combinations of assets, determining from said exposures, dependence of said fund to variations in the value of assets in said combinations, and determining from an announced value of said fund at a particular time and from subsequent changes in value in particular assets an estimated value of said fund.

According to a second aspect of the invention, apparatus for determining an estimate of value of a financial instrument, on the basis of periodic announcements of value, variations in price of potential constituent financial instruments and information regarding exposure of said financial instrument to certain risk factors, comprises means for ascertaining from historic trading data correlations between the values of traded financial instruments, means for extracting from said correlations, combinations of assets each combination having substantially no correlation with other said combinations, means for outputting, to an authorised custodian of information regarding composition of said financial instrument, information describing said combinations, and means for receiving from said custodian a relative level of exposure to said combinations on the basis of which the impact of changes in value of individual financial instruments on the value of the financial instrument of undetermined value can be established, and means for calculating an estimate of value of said financial instrument of undetermined value on the basis of said period announcement of said value and subsequent changes in value of said individual financial instruments.

Specific embodiments will now be described with reference to the appended drawings. The embodiments exemplify performance of the invention, though it will be appreciated that the scope of protection afforded by the claims appended hereto is not limited to the specific embodiments which are provided by way of example only, and that modifications and variations can be made without departing from the invention for which protection is claimed.

Figure 1:
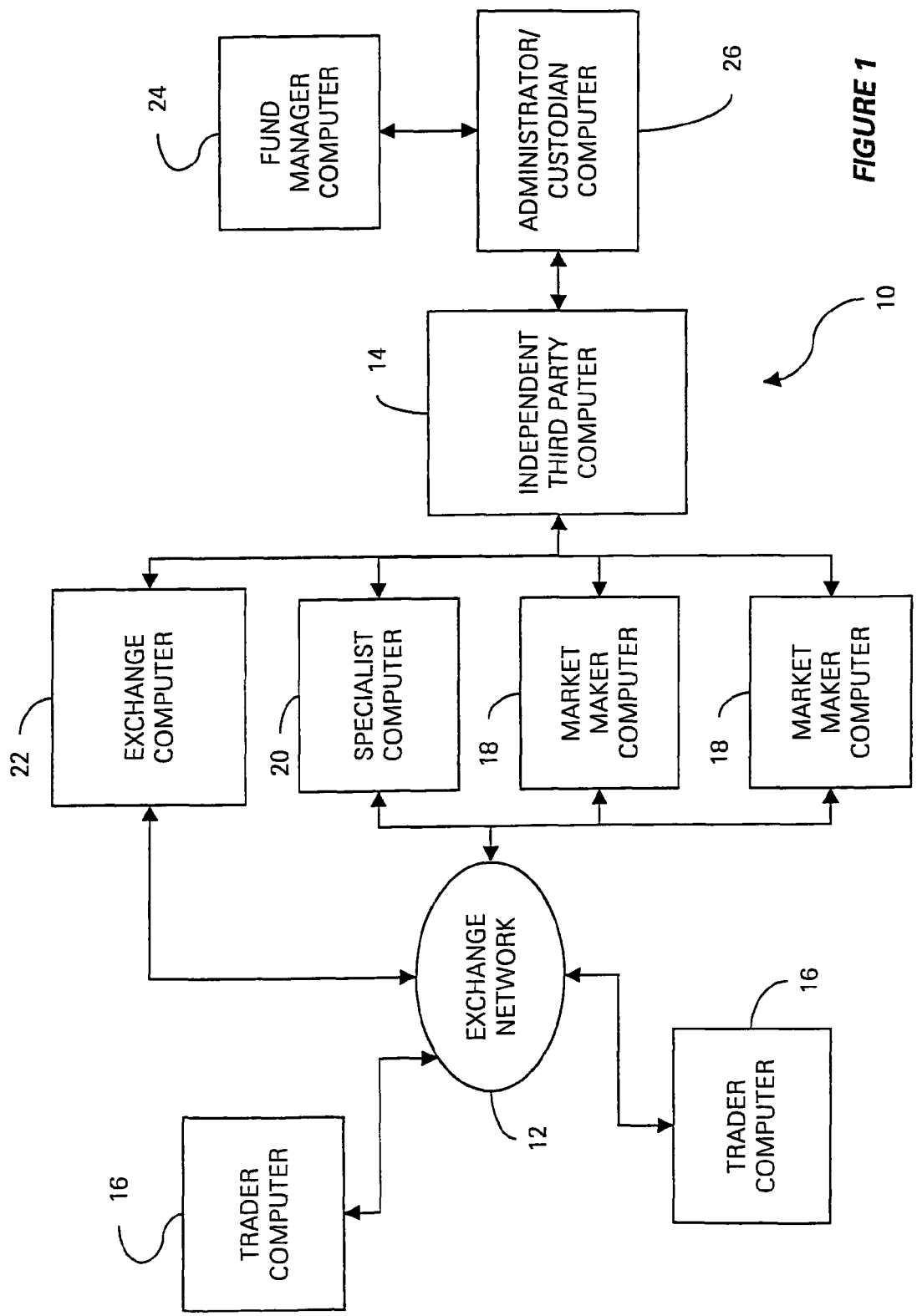
FIG. 1 is a schematic diagram illustrating a computer system used in the management of trade in an actively managed exchange traded fund, the system being of a first embodiment in accordance with the invention.

In accordance with a first specific embodiment of the invention, a computer system 10 is illustrated in FIG. 1, comprising an exchange network 12 with a plurality of trading computers 16 connected thereto, for communication with one or more of a plurality of market maker computers 18, specialist computers 20 (of which only one is illustrated in FIG. 1, for clarity), and an exchange computer 22 governing the conduct of a market in financial instruments. A computer network for use in the conduct of trade in a financial security should be of a type consistent with the size of the application, and in the present example the exchange network 12 comprises a local area network.

The trader computers 16 are provided for use by traders in the conduct of transactions in said financial instruments, the market maker computers 18 for use by a market maker, who is an appointed person for overseeing orderly conduct of the market in the financial instruments, and the likewise the specialist computer 20. The exchange computer 22 is provided to allow the exchange, an institution constituted to provide facilities for the conduct of trade in financial instruments, to record, process and provide information, such as concerning recent trading activity on a market.

A fund manager computer 24 is provided for use by a fund manager appointed to actively manage the actively managed exchange traded fund the subject of this market, and a custodian/administrator computer 26 for use by a person appointed to manage documentation associated with the activity of the fund manager, and the fund manager computer 24, in the active management of said exchange traded fund. To satisfy regulatory conditions that stipulate the separation of these parties from the activity of traders, the custodian/administrator computer 26 is connected only to the fund maker computer 24, to receive information regarding trading in instruments of which the traded fund is composed, and to an independent third party computer 14. The third party computer 14 is connected in turn to the market maker computers 18, the specialist computer 20 and the exchange computer 22 to provide these computers with an information feed containing a proxy net asset value (NAV) and hedging information to allow defined exposures to be offset.

In use, traders use their computers 16 to send messages to a market maker computer 18, via the network 12, relating to requests to buy or sell units of the actively managed exchange traded fund. The market maker computer 18 includes software, not described in further detail here, to manage these requests, to present information to the market maker in the form of a graphical display, and to receive input actions by the market maker to ensure maintenance of an orderly market. On the basis of this, the market maker will be able to respond to such requests from traders, to provide quoted prices corresponding to the requests, and therefrom to manage the transaction corresponding to the trader request.

The independent third party computer 14 stores a pricing and hedging program as is illustrated in and will be further described with reference to FIG. 2.

Figure 2:
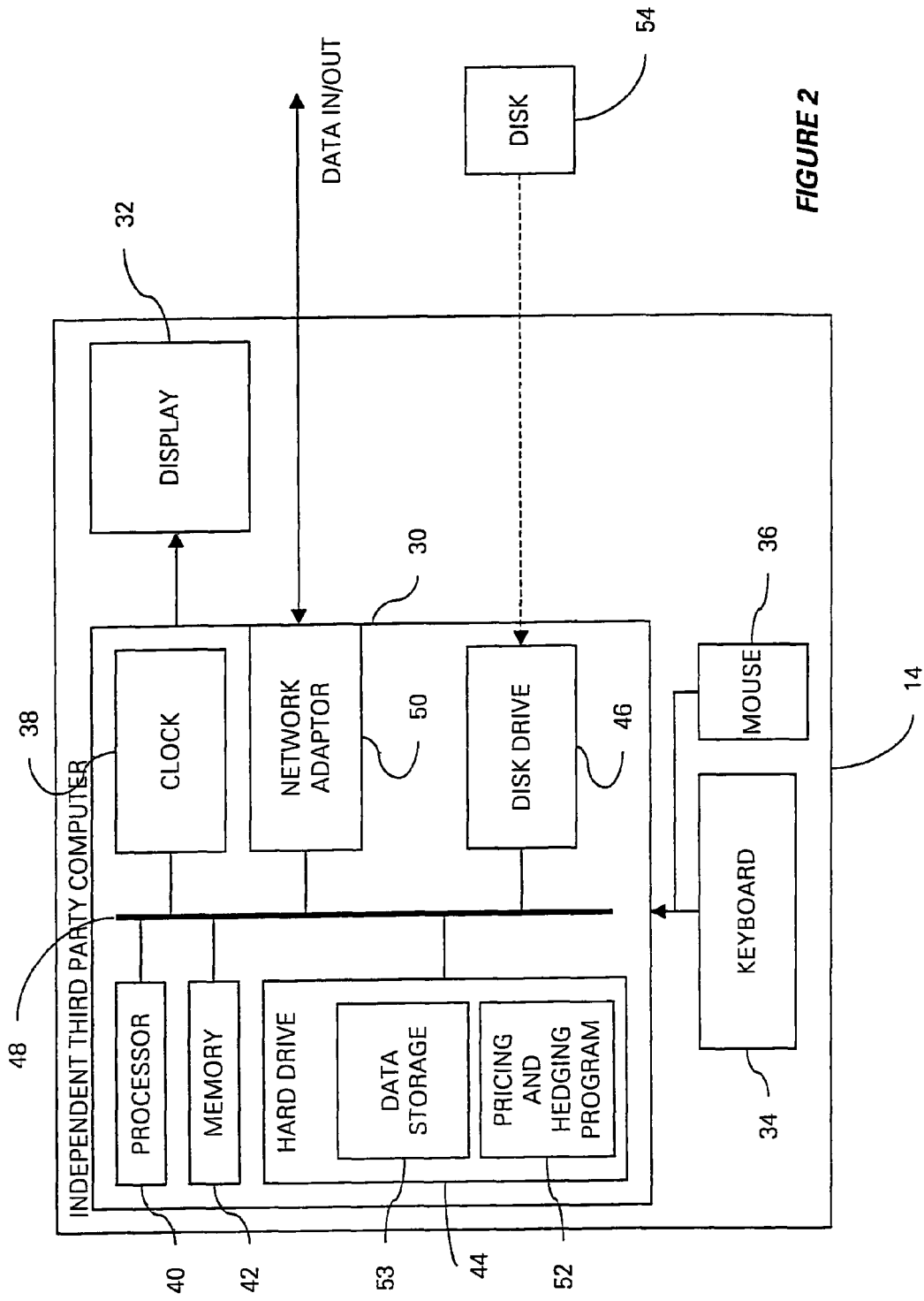
FIG. 2 is a schematic diagram of an independent third party computer in the computer system illustrated in FIG. 1.

As shown in FIG. 2, the third party computer 14 is a PC type computer, comprising a computation unit 30, with a display 32, a keyboard 34 and a mouse 36. In the computation unit 30, a clock 38, a processor 40, a memory 42 (including volatile and non-volatile memory), a hard drive 44 and a disk drive 46, are all connected to a central bus 48. The central bus 48 may be in the form of a motherboard. Also connected to the bus 48 is a network adaptor 50, for connection of the computation unit 30 to other computers.

A pricing and hedging program 52 is stored in the hard drive 44, along with a data storage unit 53. The pricing and hedging program 52 may be introduced on a disk 54, as illustrated, inserted into the disk drive 46 and copied there from into the hard drive 44. In use, routines of the pricing and hedging program 52 will be loaded under the control of the processor 40 into memory 42, for execution of program code of the routines in respect of data by the processor 40.

The function of the pricing and hedging program 52 is to configure the third party computer 14 to process stored information relating to past trading activity in the actively managed exchanged traded fund, together with trade and quote data of other instruments, such as stocks and futures, of which the exchange traded fund may be comprised, to arrive at a model capable of deriving a contemporaneous estimate of net asset value for exchange traded fund. From this, the estimated net asset value can be generated and sent to the market maker computers 18, the specialist computer 20, and the exchange computer 22, from which the market maker computers 18 can send to the trader computers 16, bid-ask spreads within a conventional range so that orderly trading can take place.

In order to achieve this, the third party computer 14, under the control of the pricing and hedging program 52, generates a message, consisting of processed data together with a list of data enquiries, which is sent to the custodian/administrator computer 26.

Figure 3:
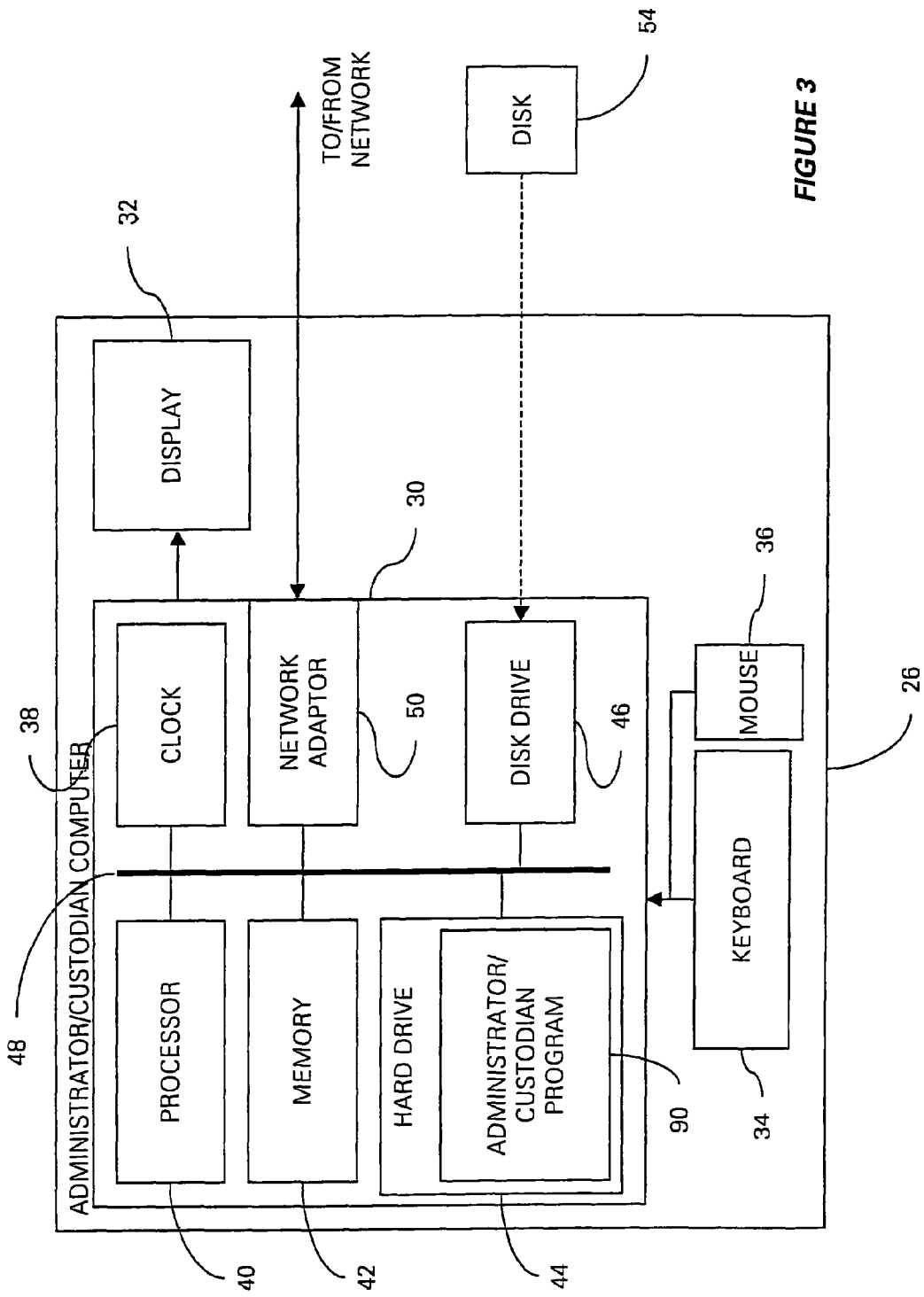
FIG. 3 is a schematic diagram of an administrator/custodian computer in the computer system illustrated in FIG. 1.

In the present embodiment, this message is transmitted after the close of business on a particular trading day, referred to here as day $\tau$.

Where appropriate, the components of the custodian/administrator computer 26 in FIG. 3 have been assigned the same reference numerals as those of the market maker computer 16.

The custodian/administrator computer 26 operates under the direction of input actions by a custodian. The custodian is an appointed person responsible for retaining documentation for a fund managed by a fund manager operating the fund manager computer 24. This documentation may comprise share certificates and the like, and the custodian will retain records of prices of these shares for management of risk and for regulatory purposes.

The data enquiries sent by the third party computer 14, to the custodian/administrator computer 26, ask for indications of levels of risk associated with particular risk factors, determined by the third party computer 14. The responses to these data enquiries will allow the third party computer 14, under the direction of the pricing and hedging program 52, to arrive at a model of the Net Asset Value (NAV) of the actively managed exchange traded fund at a time later than the time of release of the actual NAV corresponding to close of business on day $\tau$, and therefrom to estimate a contemporaneous price for a unit of said fund at a point during the trading day on day $(\tau+1)$.

Figure 4:
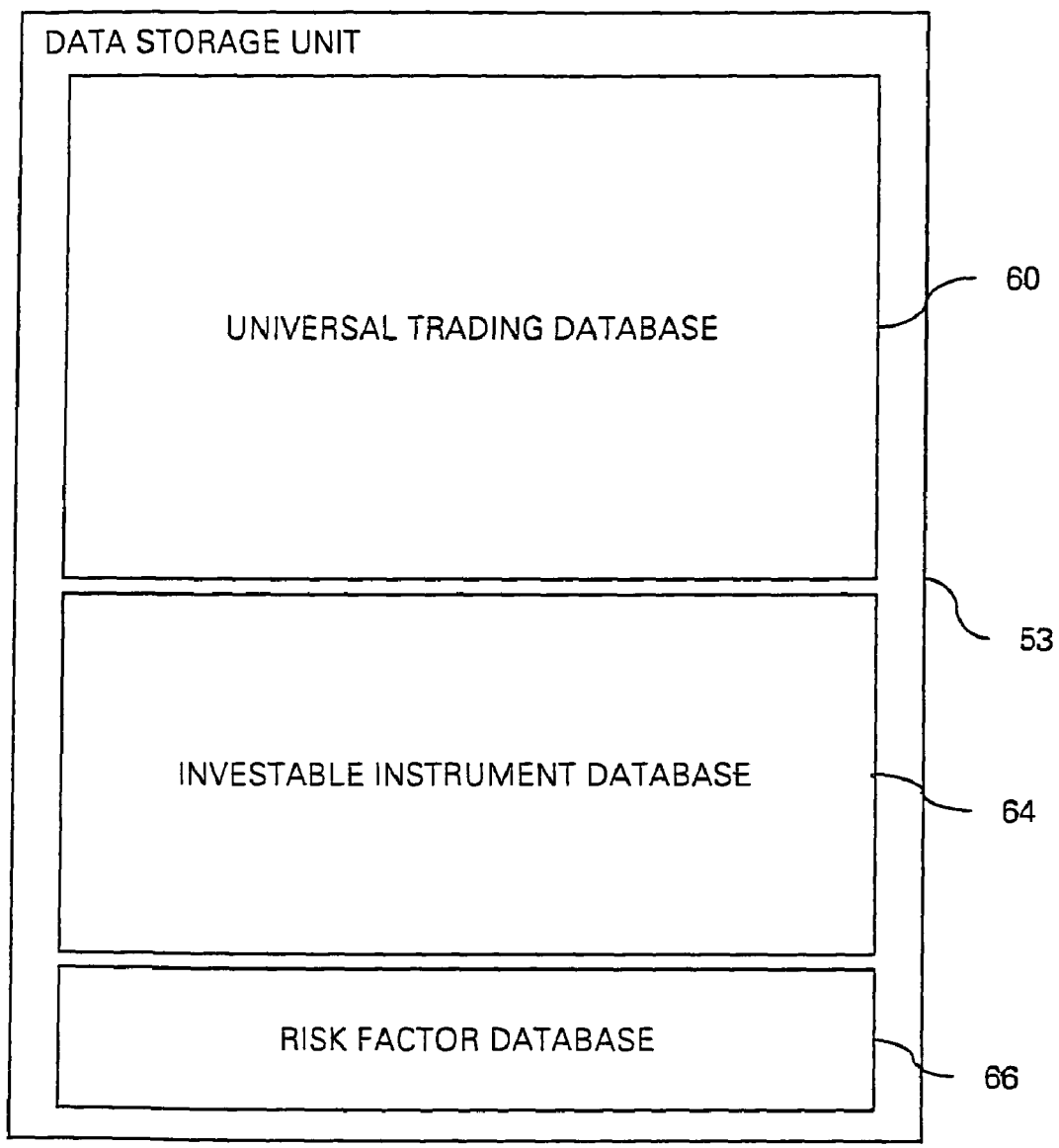
FIG. 4 is a schematic diagram illustrating data stored in a data storage unit of the independent third party computer illustrated in FIG. 2.

The manner in which information is stored in the data storage unit 53, for use by the third party computer 14 under the control of the pricing and hedging program 52, is illustrated in FIG. 4. A universal trading data database 60 stores information relating to the past trade and quotation information of every instrument in the chosen universe of instruments (in the present case this is the list of instruments traded on the London Stock Exchange). An investable stock data database 64 stores unique instrument identification information within an internal table, uniquely named for each exchange traded fund, relating to the universe of potential investable instruments i.e. those which could be component parts of the exchange traded fund, in accordance with the published information describing the exchange traded funds. This instrument identification information should match that used in the database 60 and, for example, could be a stock ticker, 'CUSIP' or 'SEDOL'. This unique identification information will need to be regularly updated & synchronised across the network of users & their associated databases, since such identification tags often change through, for example, company acquisitions.

Also stored in the investable universe database 64, per fund, is another uniquely named table that contain the sensitivities of each potential hedging instrument against the derived risk factors.

As described above, database 64 contains two tables for each fund:
1. Table A stores unique identification information for each instrument defined within the investable universe; and
2. Table B stores unique identification information for each potential hedging instrument and the sensitivities, of each aforementioned instrument, against the derived risk factors.

Whereas it is emphasised here that the actual composition of the exchange traded fund is not known to the market maker, nor to the traders, certain information defining constraints on the set of investable instruments, which it is possible that the fund comprises, can be published.

It may be that the fund manager sets himself no constraints on the types of instruments which can form part of the fund, or the universe of investable instruments can be relatively broad, such as comprising the entire listing of a particular stock market, such as the London Stock Exchange.

On the other hand, the universe of investable instruments may be limited to a particular industrial sector, such as businesses listed in the stock exchange that are associated with the oil sector, or to a particular subset of businesses measured on a predetermined criterion, such as the FTSE 350 list, which is a periodically revised list of the 350 largest companies, in terms of market capitalization, listed on the London Stock Exchange.

A risk factor database 66 stores in an internal table details of risk factors, to be described in due course, which are determined by the pricing and hedging program as being significant combinations of instruments which can be used to represent the behaviour of the overall investable universe of instruments. The characteristics and manner of determination of these risk factors will be described in due course in the following. The risk factor database will also contain the unknown portfolio risk factor sensitivities that will be discussed and further described in due course.

The risk factor database 66 will thus have a single table for each fund. This table, hereafter referred to table C, will
1. contain the historical time series for each of the derived risk factors; and
2. store the sensitivities of the derived risk factors against the unknown fund; and
3. be capable of forming a join with tables A and B associated with the same fund, in database 64.

Figure 5:
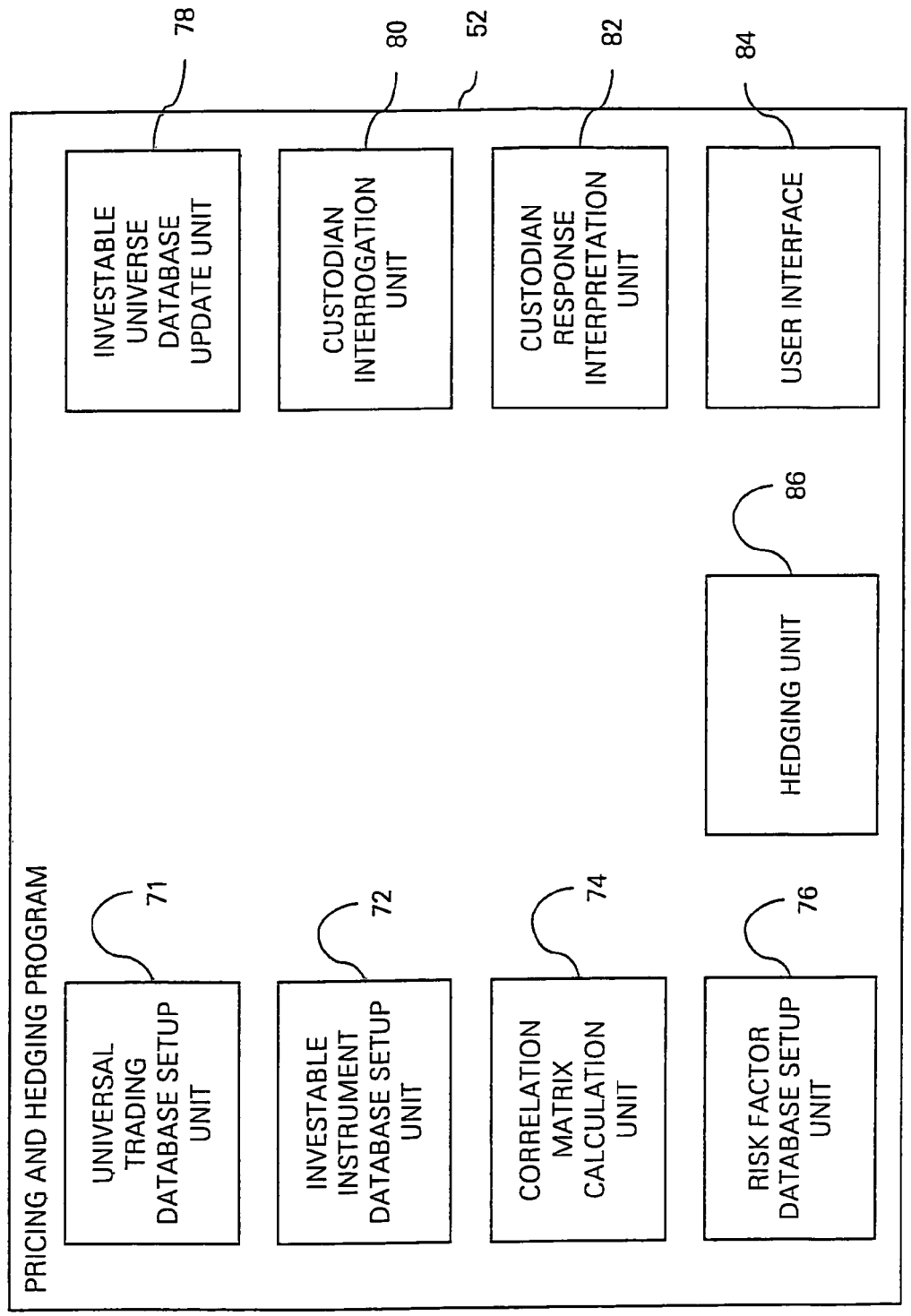
FIG. 5 is a schematic diagram illustrating software components of a pricing and hedging program stored on the independent third party computer illustrated in FIG. 2.

Operation of the third party computer 14, under the control of the pricing and hedging program 52, will now be described with reference to FIG. 5, which shows the pricing and hedging program 52 in further detail, and with reference to subsequent figures where two specific embodiments of the pricing and hedging program 52 as illustrative examples of the invention, are illustrated by means of flow diagrams.

Figure 6:
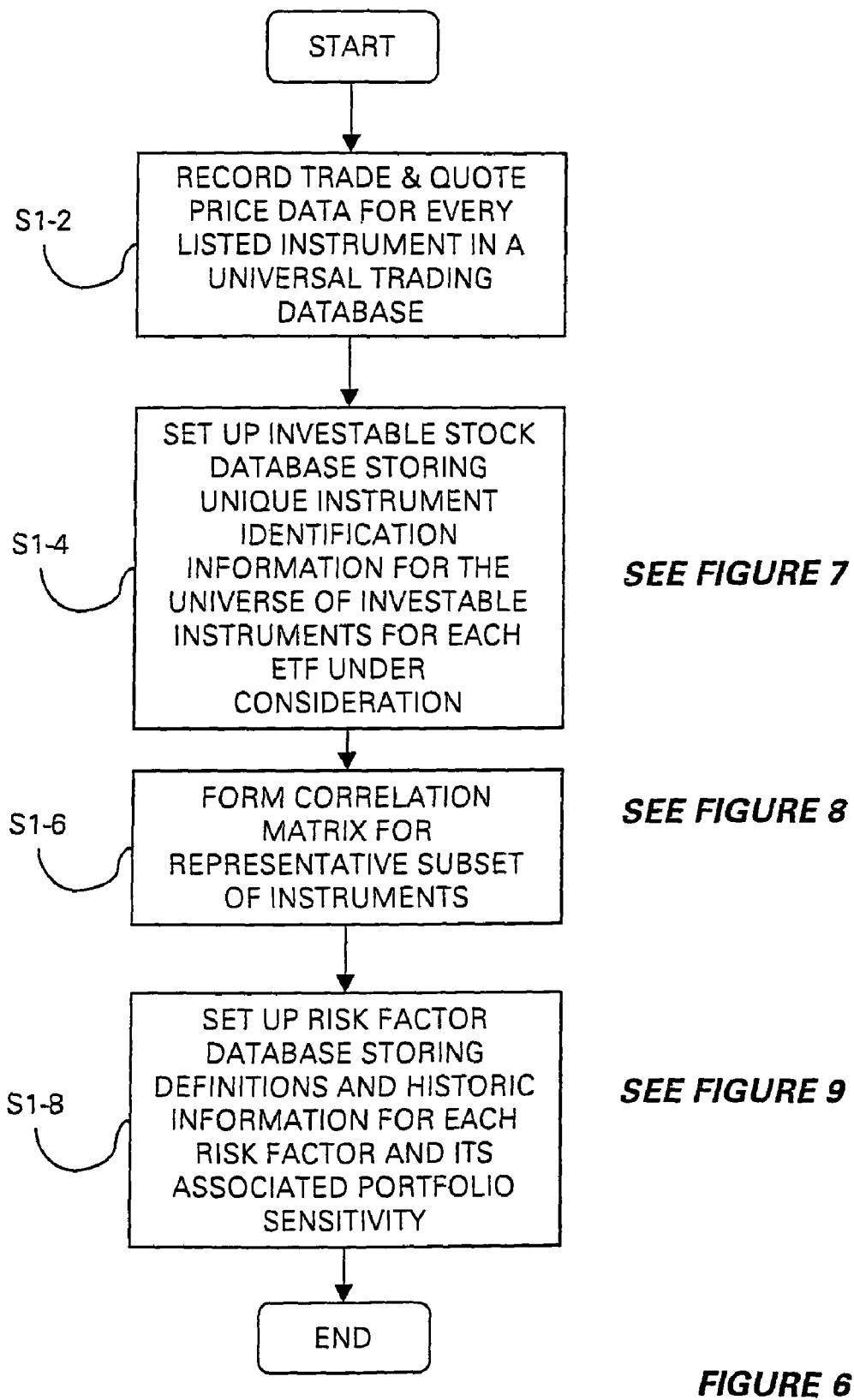
FIG. 6 is a flow diagram illustrating operation of a set up routine of the pricing and hedging program stored on the independent third party computer illustrated in FIG. 2.

In order to configure the pricing and hedging program 52 for daily use, the user, by means of a user input action, generates an activation command through a user interface 84 which in a first embodiment of the pricing and hedging program 52, causes the pricing and hedging program 52 to execute a routine as illustrated in FIG. 6.

In step S1-2, a universal trading database setup unit 71 of the pricing and hedging program 52 receives information from the exchange computer 22 relating to transactions and bid/offer prices of stocks and other instruments pertinent to the instruments identified in the universal trading data database 60. These instruments form a universal set from which the investable universe for the exchange traded fund, i.e. those instruments from which the fund manager can select investments for the fund. This information is collated and stored in the universal trading data database 60.

In step S1-4, an investable instrument database setup unit 72 of the pricing and hedging program 52 sets up, for the 'Active' ETF under consideration, table A within the investable instrument database 64 stored on the independent third party computer 14. Table A will contain the set of unique identifiers, one for every instrument contained within the funds investable universe. This information will be used in later stages of the process as will be described in due course.

Then, in step S1-6, a correlation matrix calculation unit 74 constructs a correlation matrix, stored in memory 42, for a representative subset of investable instruments, from those identified and stored in table A.

Following determination of the correlation matrix, a risk factor database setup unit 76 sets up, in step S1-8, table C within the risk factor database 66, containing definitions and historic information for each of a plurality of risk factors identified from the representative subset of investable instruments, and the sensitivities of these risk factors to the unknown Active Exchange Traded Fund portfolio which will be described in more detail in due course.

In that way, the databases 60, 64, 66, storing tables A, B and C are configured and ready to be used by the pricing and hedging program 52 for estimation of an NAV and of hedging options for use by a market maker/specialist.

The operation of the investable instrument database setup unit 72 will now be described in further detail with reference to FIG. 7.

In step S2-2, table A is defined, storing a universal set I of investable instrument unique identifiers. In this particular example, I can be a list of instruments such as the Standard & Poor 500. It will be understood that any other list of instruments would be appropriate, such as a different list of high market capitalised businesses, or a list of instruments in a particular sector of business such as Oil & Gas. Then, the number of instruments in the investable universe I is denoted N and, in this example, N=500. Each instrument which is a member of the universe I is denoted here for convenience as $S_i$ (i=1 to N).

Following close of business on day τ, for each eat in table A, information is extracted from database 60 which has recorded trade and quote price information over the most recent T trading days, T for specified for the purpose of this example as 20, and over a sampling frequency of every five minutes, by way of example. Different sampling periods and frequencies might be appropriate in particularly volatile or stagnant markets, but it is expected that, in the average case, such a period would be long enough to incorporate sufficient market activity without looking too far back at less relevant detail, while the frequency is sufficiently high to record much of the daily trading activity without overloading the system with information. The Price information recorded in this example comprises bid & offer prices though a combination of these values could also be used e.g. mid price.

Then, in step S2-6, a historic log price return series is established from the recorded information, for each instrument $S_i$ at the specified frequency.

The log price return $p_{it}$ is derived by taking the entries $P_{it}$ and defining $$p_{it}=\ln(P_{it})-\ln(P_{it-1})$$

where $P_{it}$ denotes the mid price of instrument i at the $t^{th}$ observation.

It will be appreciated that the $P_{it}$ price series could equally be based upon the bid, offer or some other combination of price, provided that every $P_{it}>0$.

Each $P_{it}$ series will contain n+1 observations where:
n+1=(number of integer periods in a single trading day at the specified frequency)*T.

In step S2-8, these log price return series are then stored in the universal data database 60. The routine called in step S1-4 then ends.

Figure 8:
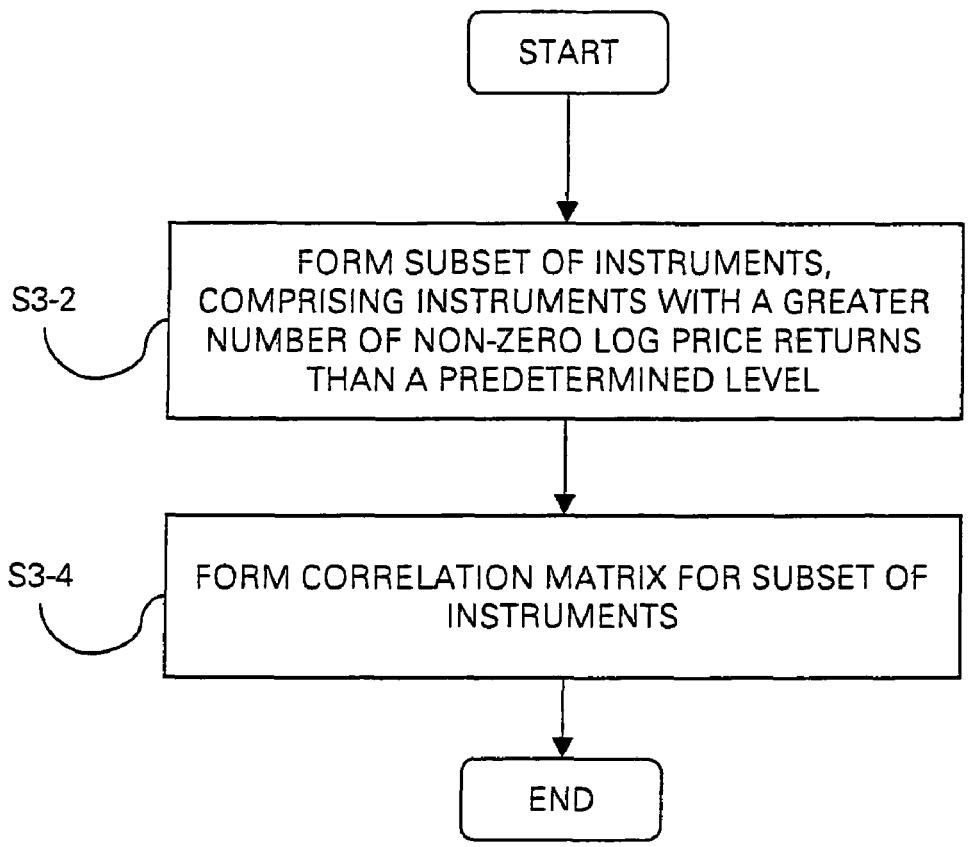
FIG. 8 is a flow diagram illustrating operation of a correlation matrix set up routine called in the routine illustrated in FIG. 6.

In step S1-6, a routine now described with reference to FIG. 8 is called. In step S3-2, following close of business on day τ and for each I defined in database 64, the set of log price return series stored in the database 60 is extracted and processed further to identify a subset $I_{sub}$ of the instruments in I that are each sufficiently populated to be taken into account in further processing.

Then, each instrument $S_i \epsilon I_{sub}$ if and only if the percentage of nonzero log price return of $p_{it}$ is greater than 60%. This number is derived to reduce the number of instruments considered in later stages to those with at last a minimum level of liquidity—there is no purpose in considering instruments whose price changes only infrequently as these may not be suitable for active fund management. The number of instruments identified in $I_{sub}$ is hereafter denoted by $N_{sub}$.

Over the n observations that form each log return price series, the correlation coefficients are then calculated, in step S3-4, for the instruments identified in $I_{sub}$, where $p_{it}$ is the correlation coefficient between instruments $S_i \in I_{sub}$ and $S_j \in I_{sub}$. These coefficients are recorded in a correlation matrix $\Omega$, which is $N_{sub}$ dimensional symmetric matrix whose elements are defined as:

$p_{it}$ for $I \Diamond j$
1.0 for $i=j$

Figure 9:
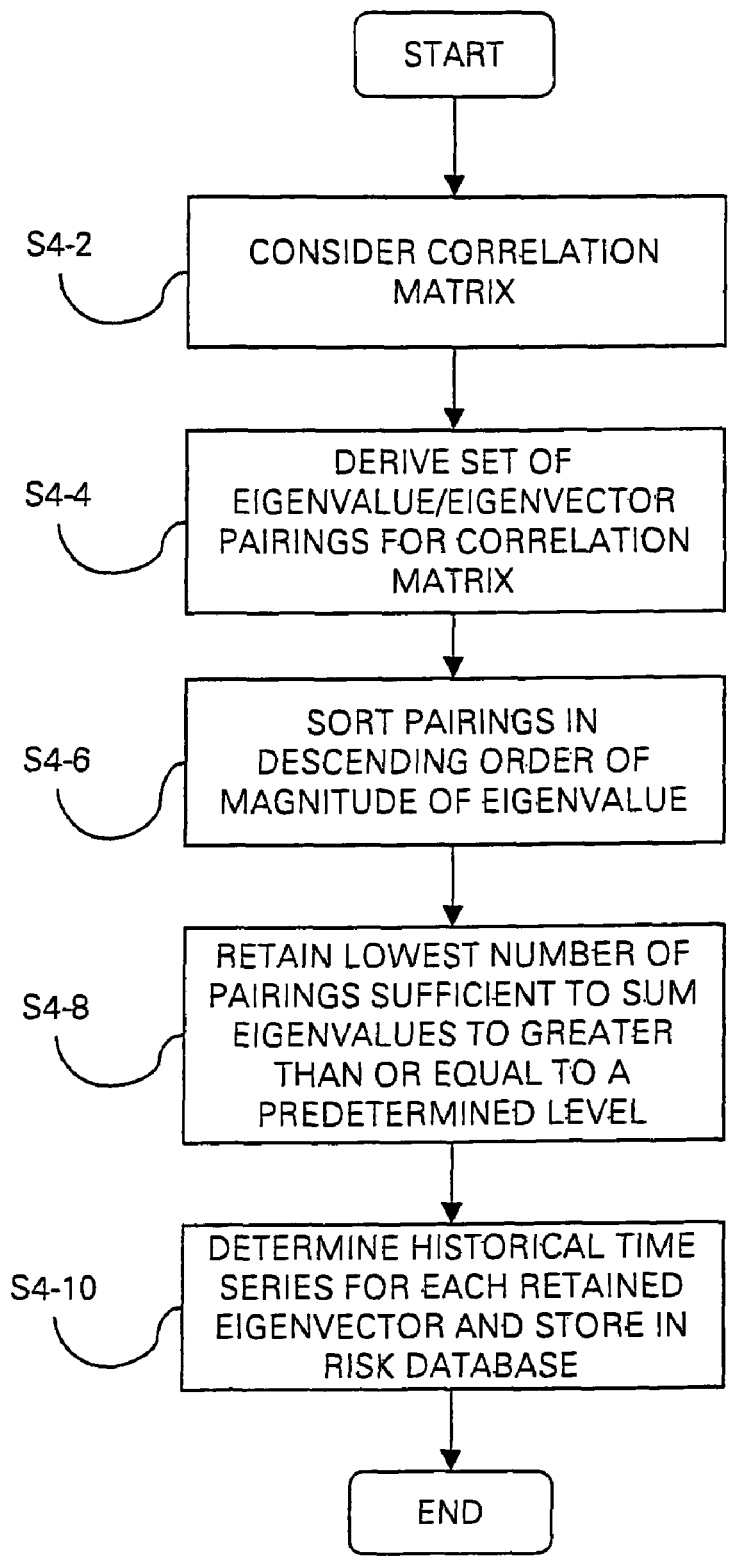
FIG. 9 is a flow diagram illustrating operation of a third database set up routine called in the routine illustrated in FIG. 6.

This correlation matrix $\Omega$ is then stored in data storage, such as the hard drive 44, for future use. It will be appreciated that there will be a unique $\Omega$ for each ($I_{sub}$, I) pair and therefore each $\Omega$ should be assigned a unique identification label for later retrieval and use. The routine called in step S1-6 then ends, and then the routine called in step S1-8 is called, as described with reference to FIG. 9.

In step S4-2 of this routine, the correlation matrix $\Omega$ is retrieved from data storage and called into memory 42 for use by the routine.

The correlation matrix $\Omega$ represents the total variation in the sub-universe $I_{sub}$, the process aims to extract the factors i.e. weighted combinations of instruments in $I_{sub}$, that explain most of the variation in $\Omega$, while at the same time ensuring that these factors are orthogonal. It is important that these factors are orthogonal since they will form a complete set of independent variables in a later regression.

Then, in step S4-4, a set of eigenvalues $\{\lambda_i\}$ and associated eigenvectors $\{e_i\}$ for the matrix $\Omega$(i=1 to $N_{sub}$) is calculated, in accordance with conventional and well-known numerical methods. These eigenvectors are extracted for further processing as they represent orthogonal explanatory factors of the correlation matrix $\Omega$.

In step S4-6, the eigenvalue/eigenvector pairings are reordered in terms of the magnitude of the eigenvalues, in descending order. Then, in step S4-8, only the k eigenvalue/eigenvector pairs are retained that are sufficient to satisfy the following condition:

$$\lambda_1 + \lambda_2 + \ldots + \lambda_k \leq (V^* N_{sub})$$

In the above condition, V is the predetermined percentage level of explanatory variation required of $\Omega$ By way of example, V could equal 55%. The eigenvectors, or risk factors as they will hereafter be termed, represent linear combinations of instruments that are, by construction, derived to move independently of other combinations of instruments. Thus, these risk factors are important to the following of behaviour of an unknown basket of traded instruments.

Each of these risk factors $e_i, \ldots, e_k$ describes a weighted basket of instruments from the subset $I_{sub}$ of investable instruments. That is:

$$e_j = [(w_{1j}^* S_1)(w_{2j}^* S_2)(w_{3j}^* S_3) \ldots (w_{Nsubj} - S_{Nsub})]$$

where each $w_{ij}$ is a real number, i=1 to $N_{sub}$ and j=1 to k. In step S4-10, historical time series are calculated for each risk factor $e_j$. These risk factors, and their associated historical time series, are then stored in table C by the risk factor database setup unit 76.

When each risk factor $e_j$ is calculated as an historical time series, the $S_i$ are replaced by a vector whose elements are the historical log price returns of $S_i$ that are stored for each instrument in database 60 and covers the most recent T trading days at the specified sampling frequency.

Figure 10:
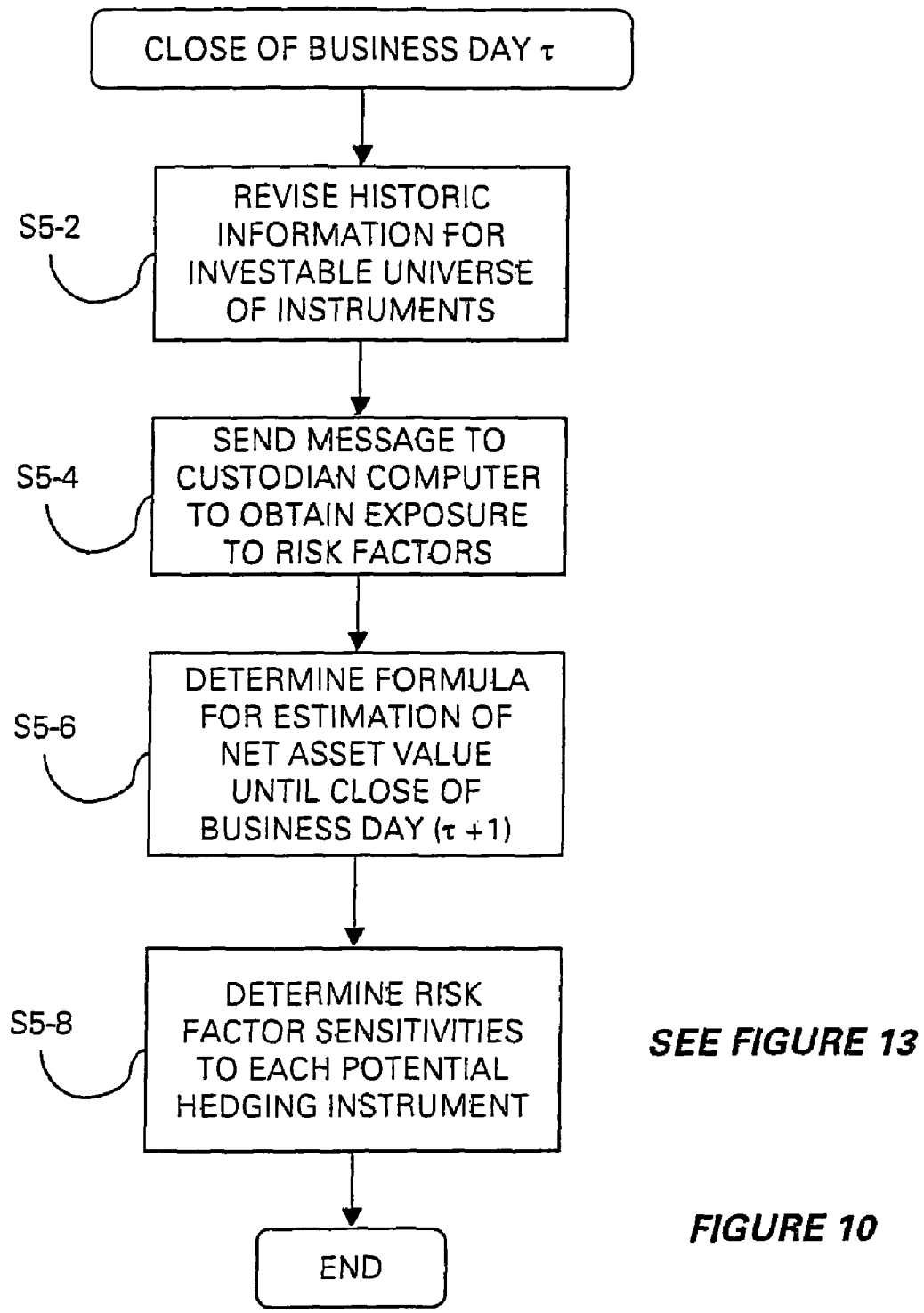
FIG. 10 is a flow diagram illustrating operation of a close of business routine of the pricing and hedging program stored on the independent third party computer illustrated in FIG. 2.

Now that the system is set up, the pricing and hedging program 52 can then be executed after the close of business every day in accordance with the routine illustrated in FIG. 10.

Step S5-2 of this routine causes an investable instrument database update unit 78 to update the investable instrument table A with new data concerning any instruments that may no longer be available for investment, any instruments that are newly available for investment and any changes to identification data that may have occurred for example through a company acquisition. These updates are made on the basis of changes made to information stored in universal database 60 during the course of day $\tau$. Also, the contents of database 60 are updated with new historic trading information. The oldest data in both series, $P_{it}$ and $p_{it}$, is thus removed in order that the data remains a suitable description of past relevant behaviour and covers the most recent T trading days. Then, the consequent information, such as the correlation matrix, the eigenvectors and eigenvalues, and the set of historic time series corresponding to the derived eigenvectors, are then processed and updated.

Then, in step S5-4, a custodian interrogation unit 80 of the pricing and hedging program 52 constructs and sends a message, after close of business on day $\tau$, to the custodian/administrator computer 26 for the fund, which is designed to cause an administrator/custodian program 90 stored on the custodian/administrator computer 26 to identify statistically the exposure of the underlying portfolio to each of the risk factors represented by the selected risk factors $e_i, \ldots, e_k$. In step S5-6, a custodian response interpretation unit 82 processes information received back from the custodian/administrator computer 26, updating table C prior to determining an induction formula for estimation of the NAV at time t during the next day ($\tau$+1) of trading. The first price displayed $NAV_0$, at open of business day ($\tau$+1), is that published & reported by the administrator/custodian as the calculated net asset value as at close of business the previous trade day $\tau$. Thereafter the estimated net asset value at every particular point in time during the trading day ($\tau$+1), can be caused to be displayed on the display 32.

In step S5-8 optimal hedging strategies can be provided to traders, market makers, specialists etc. since the risk factor sensitivities to each potential hedging instrument e.g. S&P 500, Crude Oil, USD/Sterling futures contracts can be calculated throughout the trading day ($\tau$+1).

The message sent to the administrator/custodian program contains a database of historical time series for the investable universe plus table C derived from the ($\Omega$, $I_{sub}$, I) triple. This transmitted database will comprise a simple join of tables within 60, 64 & 66. All three databases are required in this embodiment as database 66 contains table C and table A within database 64 identifies the investable universe, which identifies which time series are extracted from database 60. This transmitted database will be referred to as database Z in the following description. Thus, the administrator/custodian program 90 will be able to extract all information required to provide the relative significance of each risk factor to the fund being managed in connection with the custodian.

Figure 11:
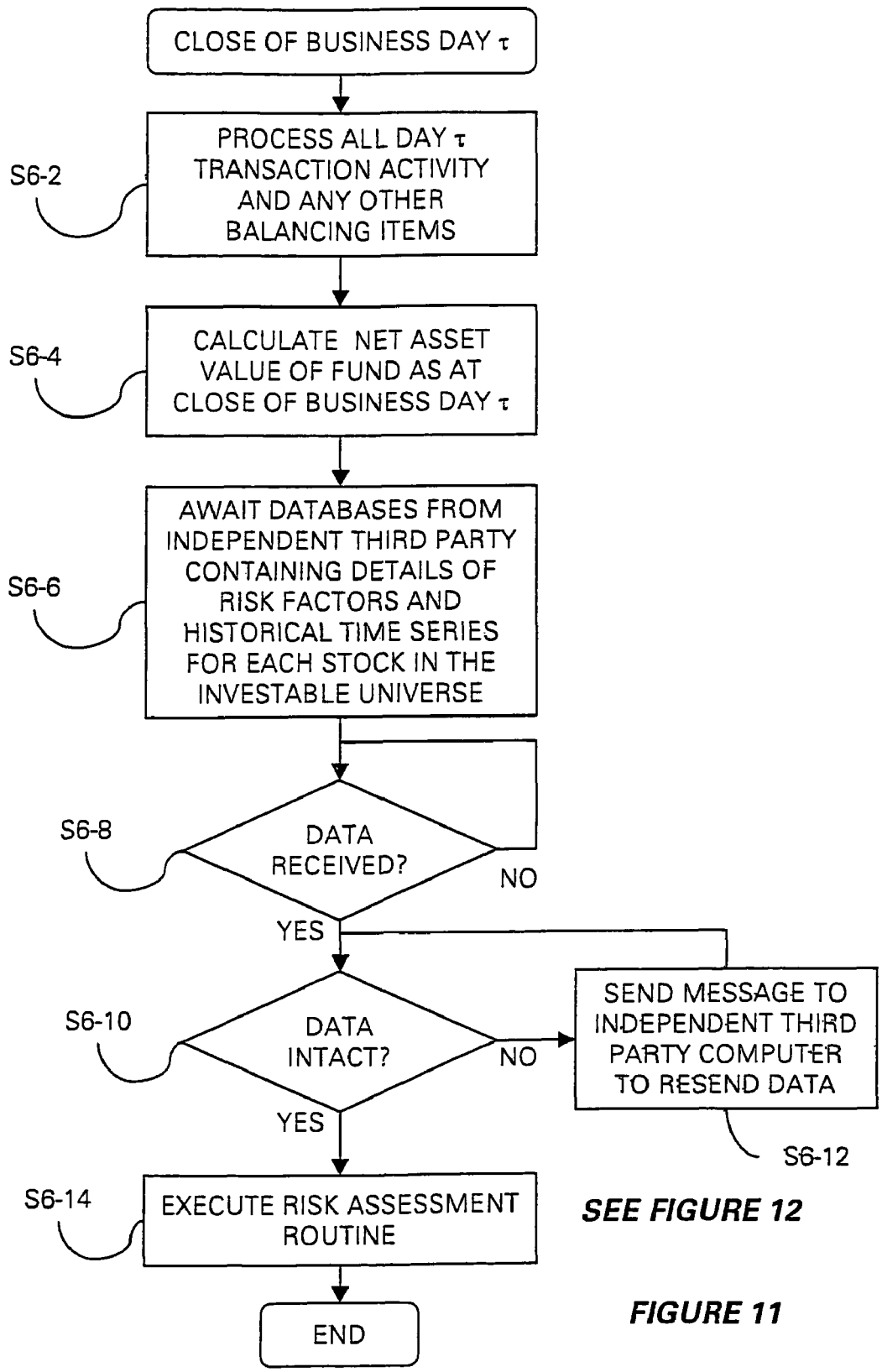
FIG. 11 is a flow diagram illustrating operation of a custodian/administrator program of the custodian/administrator computer illustrated in FIG. 3 at close of business.

The administrator/custodian program 90 operates in accordance with the routine illustrated in FIG. 11. The administrator/custodian program 90 is executed on the custodian computer after close of business trading for day $\tau$, and commences, in step S6-2 of FIG. 11, by processing all cash injections/redemptions, stock or derivative trades and balancing items occurring during day $\tau$ and over previous days, in a conventional manner.

Then, in step S6-4, the administrator/custodian program 90 calculates and is able to publish a Net Asset Value for the fund as at the close of business on day $\tau$.

In step S6-6, the administrator/custodian program 90 configures the custodian computer to await a message from the independent third party computer, as would be seat on execution of step S5-4 of FIG. 10. The administrator/custodian program 90 waits, by means of a loop set up in step S6-8. Then, in step S6-10, the administrator/custodian computer checks that the data is intact. If the data is not intact, in step S6-12, the custodian computer sends a message to the independent third party computer to resend the data.

Once a message containing intact data has been received, in step S6-14 the administrator/custodian computer executes a risk assessment routine, as will be described in further detail with reference to FIG. 12.

Figure 12A:
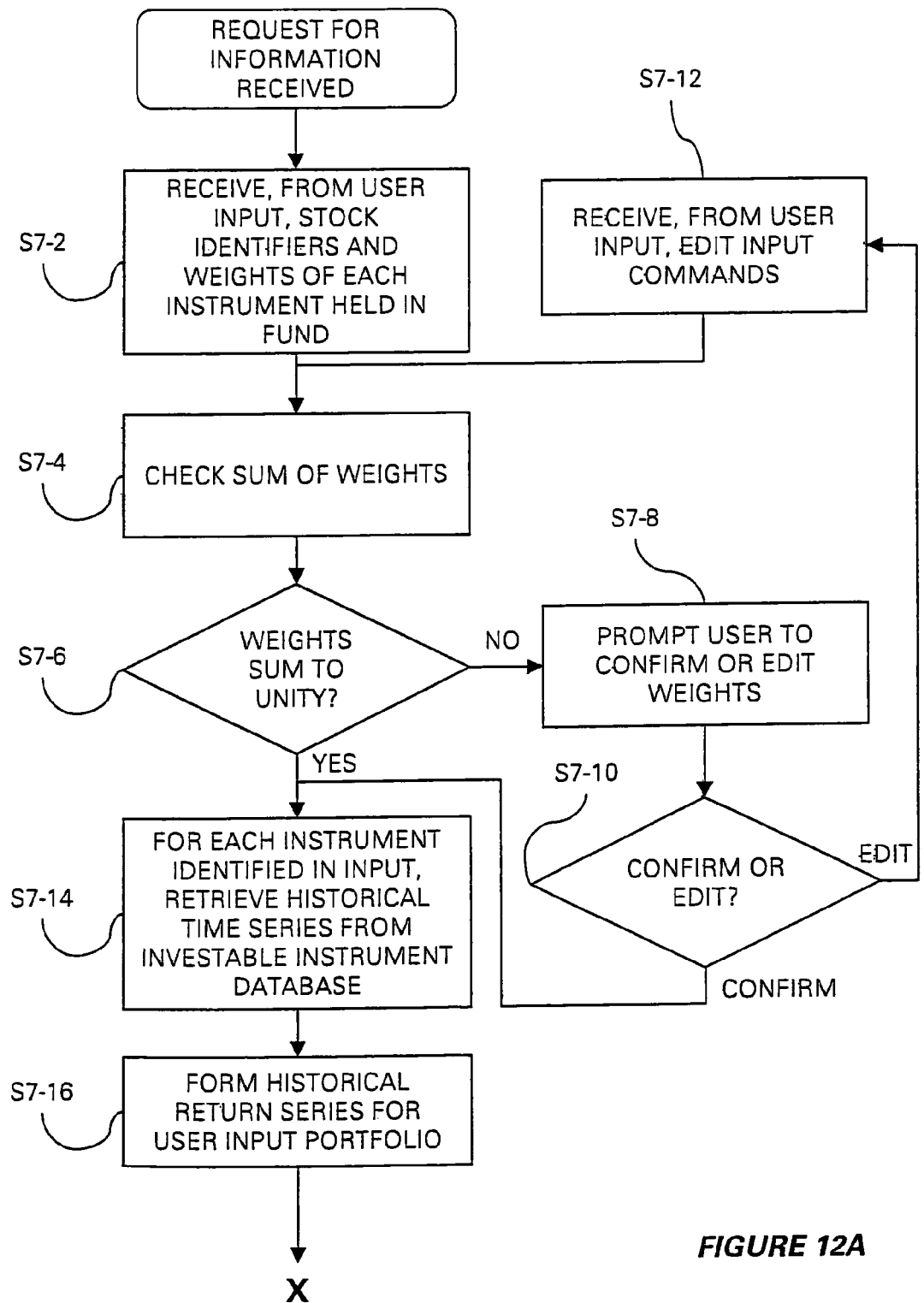
FIG. 12 is a flow diagram illustrating operation of a risk assessment routine of the custodian/administrator program illustrated in FIG. 11.
Figure 12B:
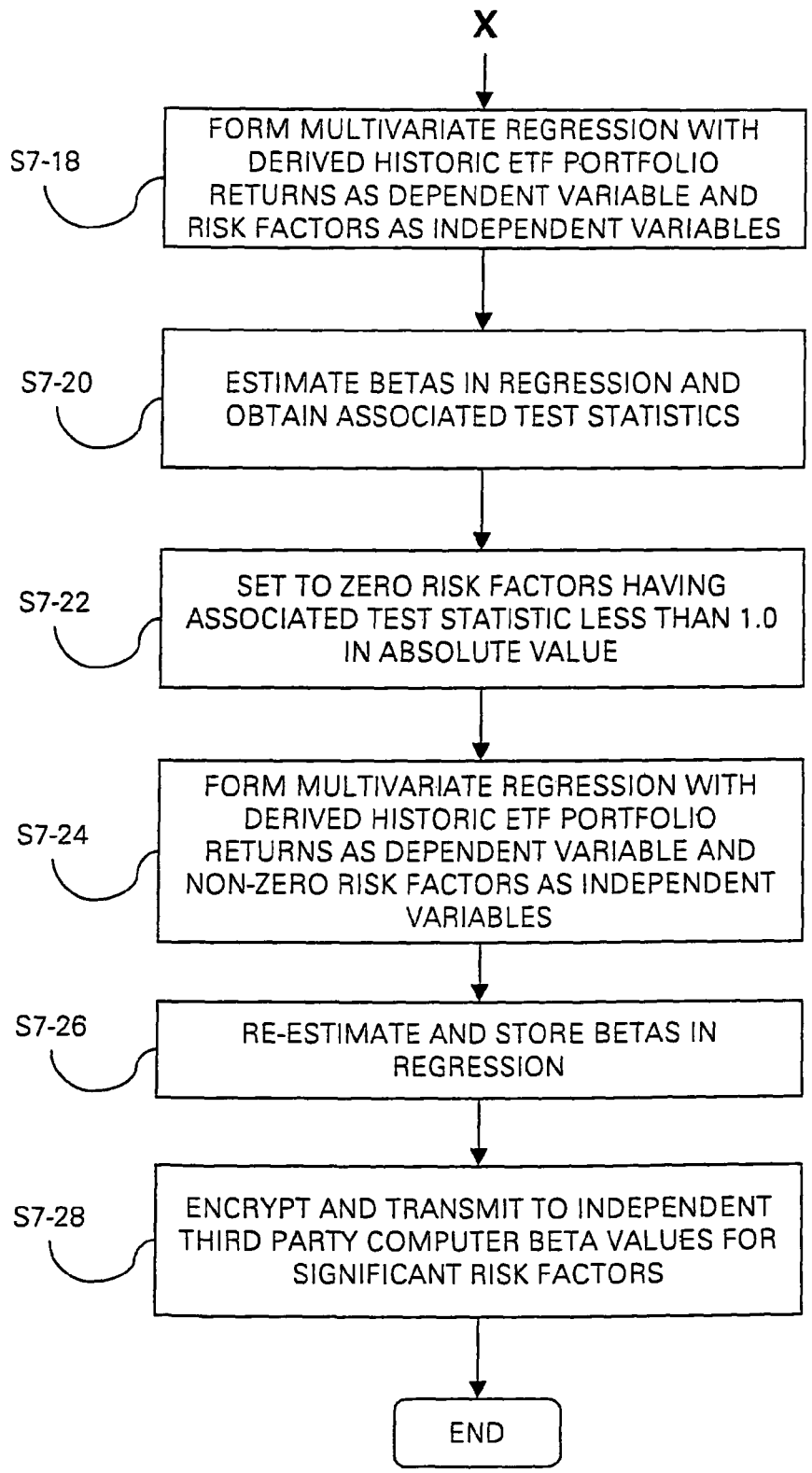

The performance of the risk assessment routine will now be described with regard to FIG. 12, which is composed of FIGS. 12A and 12B, with a continuation denoted by the letters X on each page of the drawings concerned.

In response to receipt of a message from the independent third party, the administrator/custodian program 90 starts, in step S7-2, by prompting a user, who will in normal circumstances be an employee of the administrator/custodian, an authorised person entrusted with the highly commercially confidential information regarding the composition of an exchange traded fund, to enter both the unique identifier and associated percentage weight for every instrument contained within the portfolio into a user input device such as the keyboard 34.

In step S7-4, the weights entered into the user input device are read and their sum checked to ensure that all instruments in the fund have been accounted for. In step S7-6, the program makes an enquiry as to whether the weights sum to unity—if not, then in step S7-8 the user is prompted either to confirm the weights or to re-enter them; in step 7-10 the routine enquires as to whether the user has responded to confirm or to edit. If the user has chosen to edit, then in step S7-12, the routine receives edit input commands, and proceeds from step S7-4 onwards.

Otherwise, or if in step S7-6 the sum of the weights was unity, the administrator/custodian program 90 proceeds in step S7-14 to retrieve, for each instrument identified at the input device, the corresponding historical time series from database Z received in the message from the independent third party computer. Then, in step S7-16, a historical return series for the portfolio is constructed, based on the composition of the portfolio as input by the user after the close of business on day $\tau$. This information is stored locally, and will not be made known to external parties.

Then, in step S7-16, the routine forms a multivariate regression as follows:

$$P = \beta_1 \cdot e_1 + \beta_2 \cdot e_2 + \beta_3 \cdot e_3 + \ldots + \beta_k \cdot e_k + \text{noise}$$

where:

$\beta_i \ldots \beta_k$ are unknown and will require estimation;
Each $e_j$ is a vector of historical return series formed in step S4-10; and
P is a vector whose elements are the historical log price returns formed in step S7-16, denoted:

$$P = \phi_1 * H_1 + \phi_2 * H_2 + \phi_3 \cdot * H_3 + \ldots \phi_m * H_m +$$

in which:

$H_i$ is the vector whose elements are the historical log price returns extracted for holding i from the database Z that was sent in the 'message to custodian' in step S5-4;

$\phi_i$ is the percentage weight of holding i within the portfolio and as calculated by the administrator/custodian after close of business on day $\tau$; and m is the number of the holdings within the portfolio and as calculated by the administrator/custodian after close of business on day $\tau$.

From the regression which is carried out in step S7-20 in accordance with standard numerical methods and techniques, an estimate is made for each beta coefficient, together with its associated test statistic. This may lead to one or more of the betas being associated with insufficiently high test statistics (t-test less than 1.0 in absolute value) to justify consideration of the associated risk factor in further consideration of the behaviour of the fund.

Thus, in step S7-22, the administrator/custodian program 90 rejects risk factors from further consideration that are associated with test statistics less than 1.0 in absolute value. This is a relatively low threshold, but as there are potentially a large number of variables, together with a high degree of noise, a higher threshold would likely involve elimination of risk factors which would in fact be of use in describing the contemporaneous behaviour of the unknown portfolio during day ($\tau$+1). This rejection is achieved by setting the betas associated with the insufficiently significant test statistics to zero.

With the new reduced set of risk factors, step S7-24 repeats the formation of a regression, omitting the risk factors with insufficiently high test statistics associated therewith. Then, step S7-26 re-estimates and stores the new betas, and in step S7-28 the full set of betas, comprising those calculated in step S7-26 together with those set to zero in step S7-22, are encrypted and sent back to the independent third party computer 14. This ends the execution of the risk assessment routine, and thus of the custodian program.

Following receipt of the betas for the risk factors, determined by the custodian administrator computer 22, the third party computer 14 is then able to determine a formula for the NAV of the unknown portfolio following the updating of table C with the betas i.e. the unknown portfolio risk factor sensitivities. As the instruments making up the risk factors will vary in value through each trading day so will the value of the risk factors themselves. In particular, the NAV at time $\tau$, on trade day ($\tau$+1), can be estimated by induction:

$$\text{NAV}_t = \text{NAV}_{t-1} * \exp(\beta_1 * e_{1,t} + \beta_2 * e_{2,t} + \beta_3 * e_{3,1} + \ldots + \beta_k * e_{k,t})$$

Where $\text{NAV}_0$ corresponds to the published net asset value as at close of business on trade day $\tau$ and is used as exchange opening value on trade day ($\tau$+1) and $e_{j,\tau}$ denotes the value of the $j^{th}$ risk factor at time t.

The pricing and hedging program is operable to calculate this price estimate at regular intervals, and to make it available to permitted parties, who may include the exchange computer 22, the specialist computer 20 and the market maker computers 18. This service can be provided for a subscription fee, or may be available free of charge to all members of the exchange which itself contracts the independent third party independently to provide the information to all members free of charge.

A further facility provided in the pricing and hedging program 52 is a hedging facility, implemented by a hedging unit 86. This facility allows a trader, market maker, specialist etc. to identify hedging strategies to counteract any exposure that they may create by taking a position in the market contrary to prevailing trends. The operation of the hedging unit 86 will now be described with reference to FIG. 13.

Initiation of the routine is by user input action, through user interface 84. The user interface is made available to market makers through the link between the market maker computers 18 and the independent third party computer 14. The routine commences in step S8-2 by prompting the user to input details of a set $\{F_i\}$ of instruments to be used as hedging instruments. These hedging instruments would habitually have recorded trading data held in the universal instrument database 60.

Because each hedging instrument $F_i$ can potentially be used as a hedge against any number of different 'Active' exchange traded fund shares, the factor sensitivities against each fund will be required and these will be stored, for each fund, in table B contained within the investable universe database 64.

For each hedging instrument $F_i$, in step S8-4 the routine will form a multivariate regression with the hedging instrument as the dependent variable and the independent variable that are the stored risk factors in table C, corresponding to the $(\Omega, I_{sub}, I)$ triple, for the EFT share being hedged.

Then for each hedging instrument a multivariate regression and estimation will be carried out for each set of risk factors $e_i, \ldots, e_k$ derived from each $(\Omega, I_{sub}, I)$ triple.

$$F_i = \theta_{i,1}*e_1 + \theta_{i,2}*e_2 + \theta_{i,3}*e_3 + \ldots + \theta_{i,k}*e_k + \text{noise}$$

In step S8-6, the regression is performed which generates a new set of sensitivity coefficients $\{\theta_{iv}\}, v=1$ to $k$, with associated test statistics—those which have test statistics lower than 1.0 in absolute value are rejected in the manner described above.

In step S8-8 the multivariate regression is reconstructed, with only the statistically significant i.e. t-statistic greater than 1.0 in absolute value risk factors included and once again re-estimated. These latest estimated coefficients are then stored in step S8-10 in table B for each hedging instrument $F_i$. Thereafter, at any point t during trade day $(\tau+1)$, the optimal combination of hedging instruments to effectively hedge the portfolio risk factor sensitivities, received in step S7-28, can be calculated. In step S8-12 the optimal hedging portfolio is constructed by means of standard quadratic programming techniques for optimisation.

Figure 14:
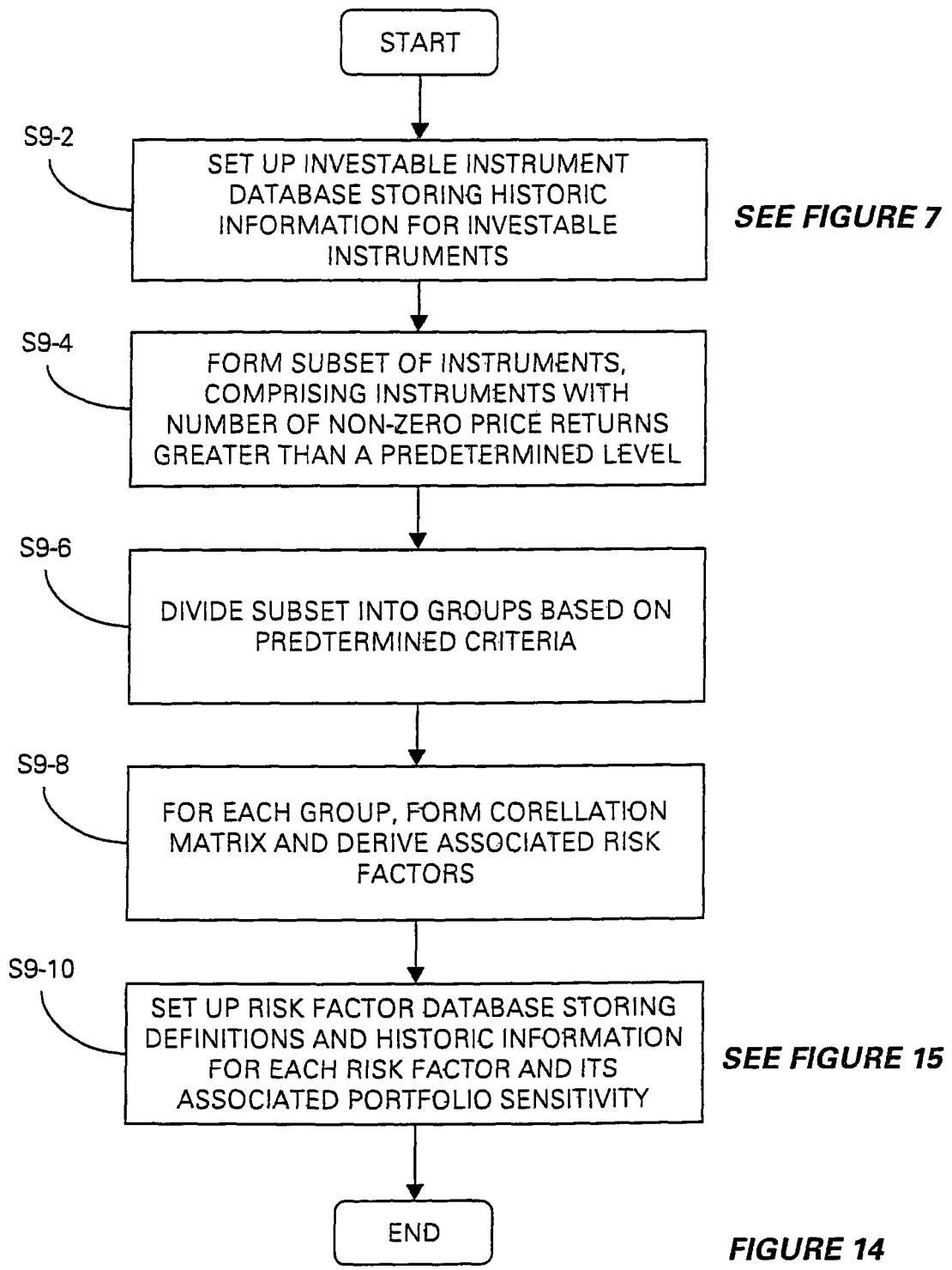
FIG. 14 is a flow diagram illustrating operation of a set up routine of a second embodiment of a pricing and hedging program stored on the independent third party computer illustrated in FIG. 2.

FIGS. 14 and 15 illustrate a second embodiment of the pricing and hedging program 52. The other parts of the system remain the same as for the first embodiment.

Figure 7:
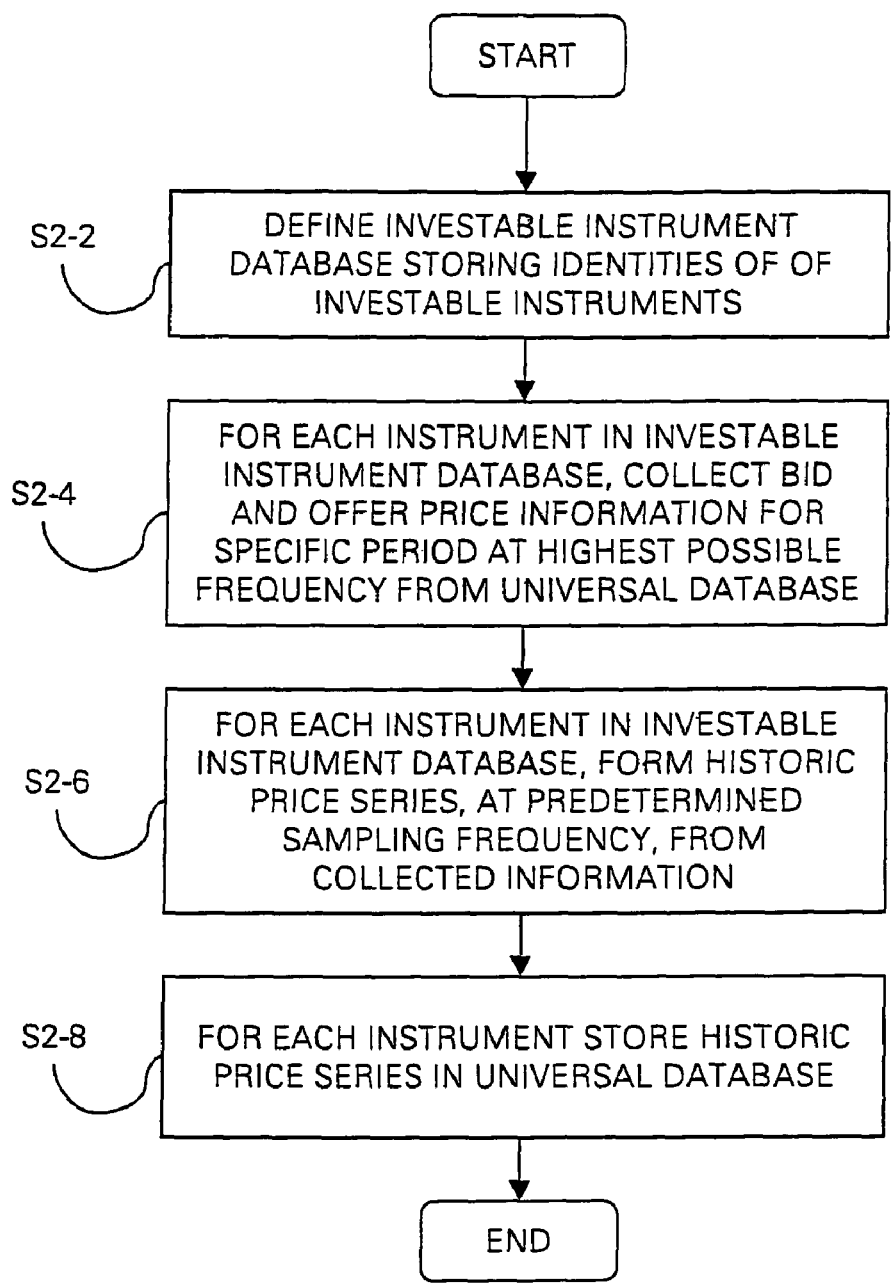
FIG. 7 is a flow diagram illustrating operation of a risk factor database set up routine called in the routine illustrated in FIG. 6.

In step S9-2 of the pricing and hedging program 52 of the second embodiment, tables A and B within the investable instrument database 64 are defined as for the first embodiment, for which see FIG. 7 and corresponding specific description.

Then, in step S9-4, a subset of the universe of investable instruments is formed, on the basis of a threshold number of non-zero price returns as with the first embodiment.

The instruments in this subset $I_{sub}$ are then divided into groups, in step S9-6, on the basis of predetermined criteria—in this example by business sector. Thus, all oil and gas based instruments will be grouped together as would banks & insurance companies. In step S9-8, a correlation matrix is then formed for each group, from which risk factors are then derived as selected significant eigenvectors as described above in relation to the first embodiment.

Then, table C within the risk factor database 66 is set up in step S9-10 with definitions and historic time series information for each risk factor, by means of a risk assessment process as illustrated in further detail in FIG. 15.

Figure 15A:
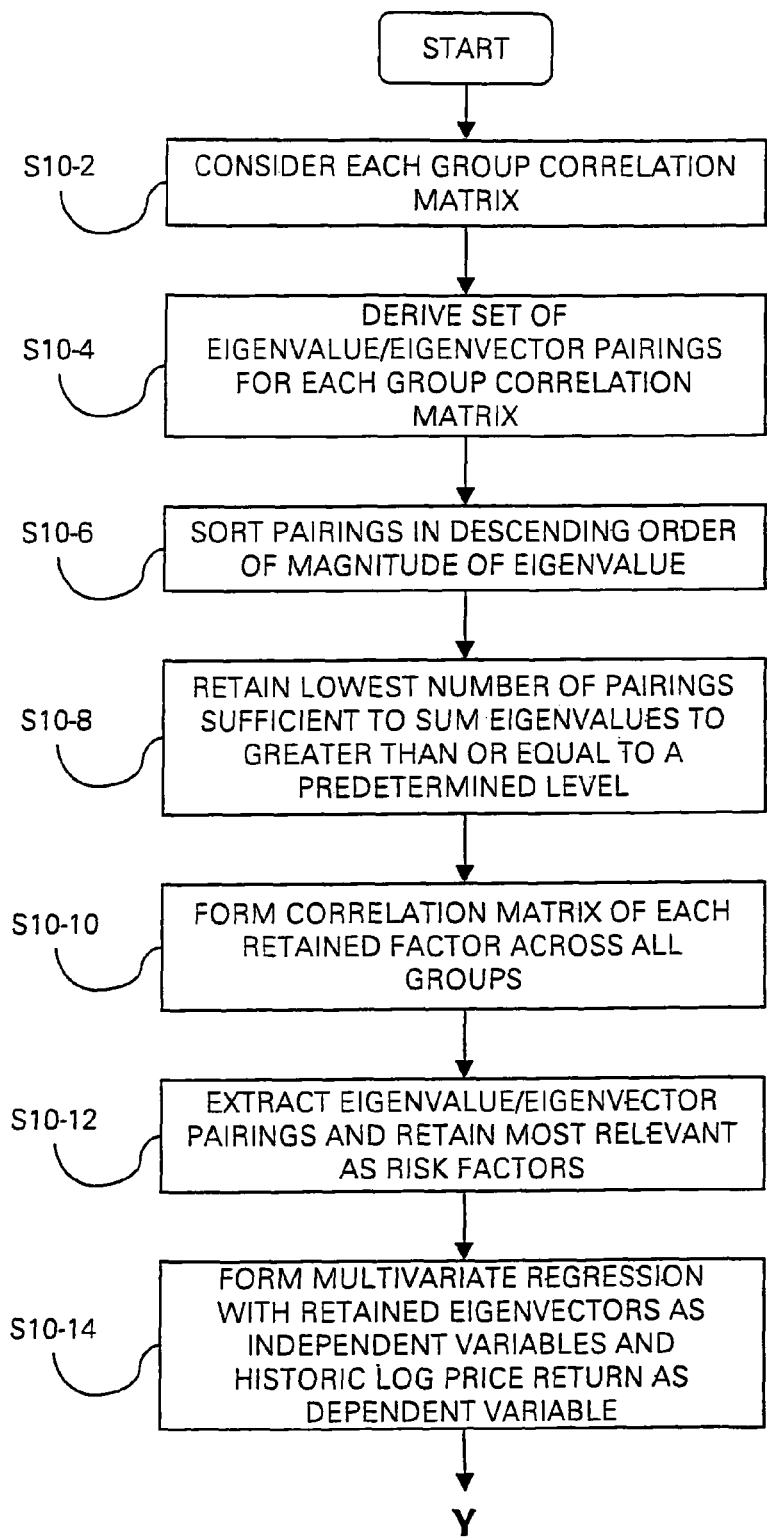
FIG. 15 is a flow diagram illustrating a third database set up routine in accordance with the second embodiment.
Figure 15B:
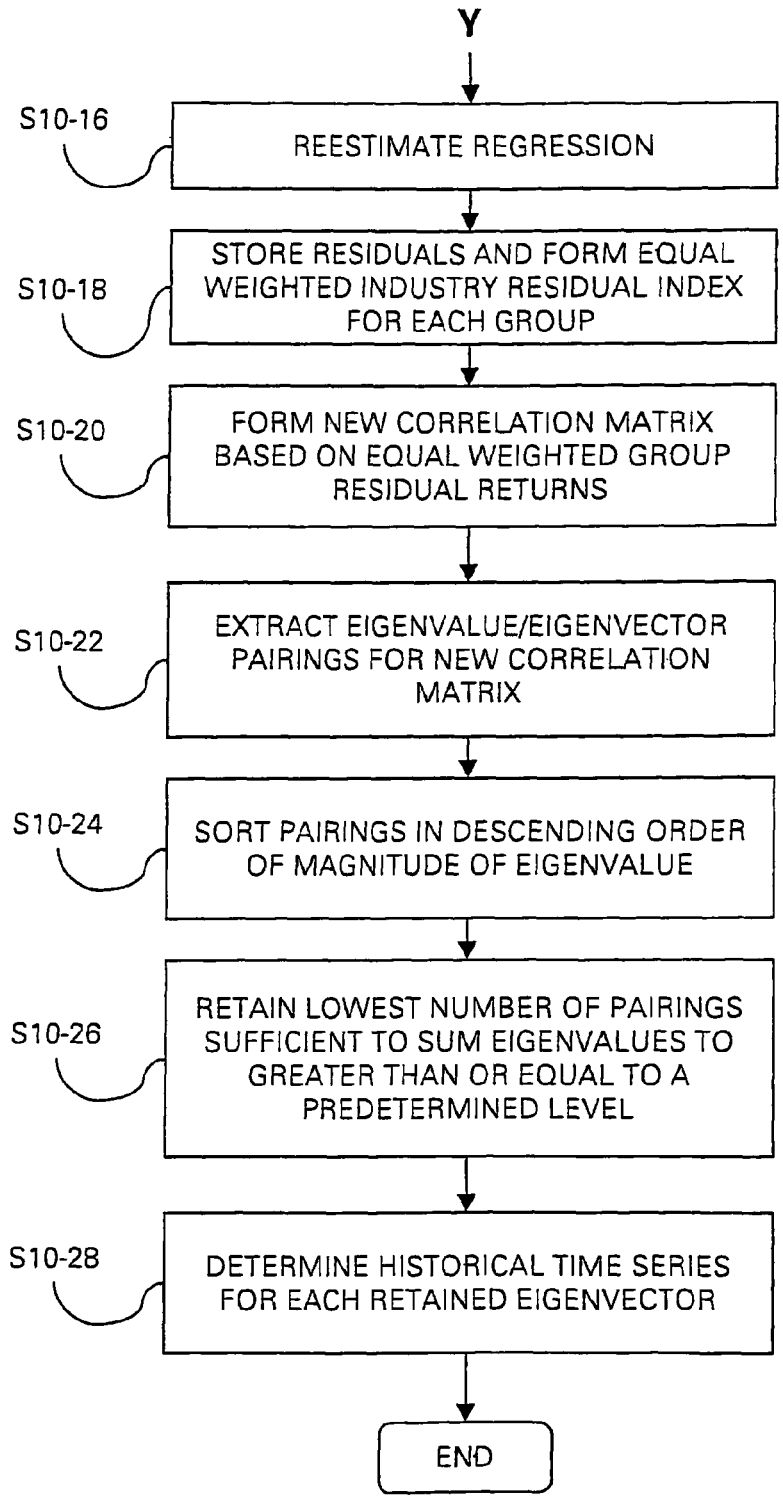

FIG. 15 is composed of FIGS. 15A and 15B, with a continuation denoted by the letter Y on each page of the drawings concerned. The routine commences, in step S10-2, by storing each group correlation matrix in memory for further processing. Then, in step S10-4, the eigenvector/eigenvalue pairs are calculated for each matrix, in conventional manner.

For each matrix, in step S10-6, its eigenvector/eigenvalue pairings are sorted in descending order of eigenvalue magnitude, following which in step S10-8 the fewest number of pairings are retained that are sufficient to sum the eigenvalues to a value greater than $(N_{group}*V)$, where V is the predetermined percentage level of explanatory variation required of the group correlation matrix. By way of example, V could equal 55% and $N_{group}$ is the dimension of the group correlation matrix.

Once the risk factors have been derived from each group a new correlation matrix is formed in step S10-10. The correlation matrix is constructed by correlation correlating each and every retained risk factor from each group across all groups. So for example if 2 groups of stocks were processed, and 5 risk factors retained from group 1 and 6 retained risk factors from group 2, the correlation matrix would be symmetric and have dimension 11.

Then, in step S10-12, a further eigenvalue/eigenvector decomposition is carried out on the new correlation matrix and in the manner described above, the most relevant risk factors are retained although by way of example V would be slightly reduced for example to 45%.

This new set of retained risk factors is now stored in table C and used in step S10-14 as the set of independent variables in a regression. This regression is carried out for each instrument that is in the filtered investable universe $I_{sub}$, the dependent variable in each regression being the instrument's historical log price return calculated over the previous T trading days at the specified sampling frequency. This regression is estimated and then re-estimated as usual in step S10-16 with the risk factor historical time series stored in table C. However, this time after the second re-estimation in step S10-18 the residuals are gathered and used to form an equal weighted group residual return. A further correlation matrix is then formed in step S10-20 where the elements of the matrix represent the correlation between the different group residual returns. Once again a new set of eigenvalues/eigenvectors is derived in step S10-22, as usual, and risk factors derived in step S10-24 and relevant ones retained in step S10-26. In step S10-28 a historical time series for each retained risk factor is then formed and stored in table C.

Performance of the remaining features of the second embodiment, such as the derivation of sensitivities to risk after close of business, are performed in the same manner as with the first embodiment with reference to FIGS. 10 to 13. The combined set of risk factors derived in the method illustrated in FIG. 15 is sent to the administrator/custodian after close of business on day $\tau$ in order that a model for the estimated contemporaneous NAV for day $(\tau+1)$ can be derived.

Figure 13:
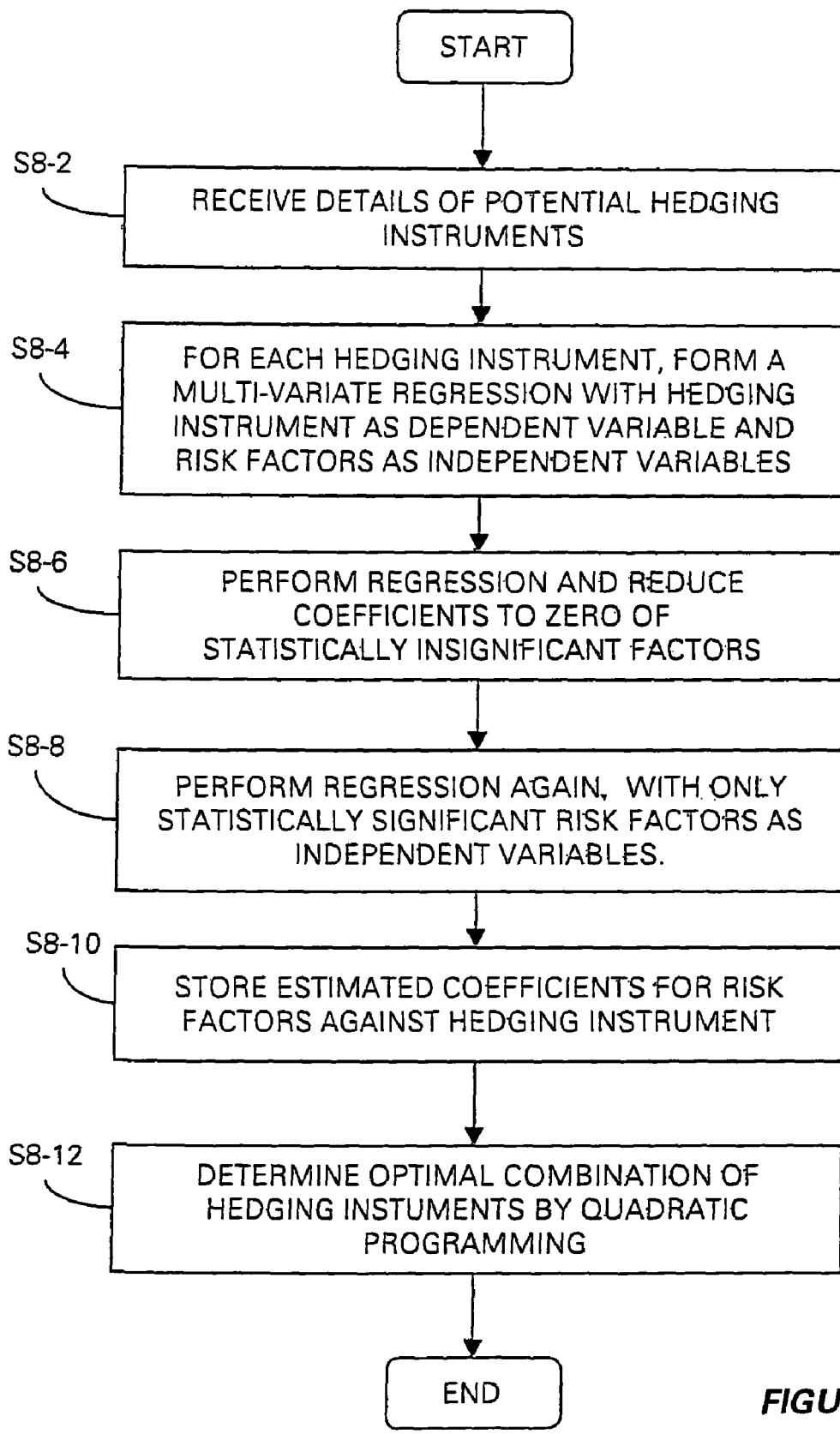
FIG. 13 is a flow diagram illustrating operation of a hedging unit of the pricing and hedging program illustrated in FIG. 5.

Further, the combined set of risk factors is used to determine sensitivities of each hedging instrument to the risk factors as described in FIG. 13.

Whereas the system described above as the specific embodiment of the invention comprises a local area network, it will be appreciated that the invention can also be applied to a system incorporating a wide area network, the Internet, or a mixture of different types and capacities of network. It will be appreciated that the correlation matrix is not the only manner of identifying principal risk factors. Other matrix types, such as a covariance matrix, a weighted correlation matrix, a weighted covariance matrix etc could also be used, and would produce acceptable risk factors. In another embodiment of the invention, the number of retained risk factors could equally be set to a predetermined fixed number or based upon a statistical 'goodness of fit' measure.

Moreover, it will be appreciated from the foregoing description that the numerical value of the test-statistic can be set at a different value.

Further, whereas the invention has been described in the context of a fund where no information is known of the composition thereof, it will be appreciated that the fund may have published characteristics, such as being composed of securities (for example Equities, Bonds, Futures contracts, Options, Warrants, Cash, Forward Foreign exchange contracts, exchange traded funds, Commodities etc.) of a particular industry sector, or of a particular stage of maturity. In that case, the population from which data must be retrieved to train the model will be consequently smaller.

Although the embodiments of the invention so described are described in the context of performance on a computer network or a combination of computer networks, configured by computer programs installed thereon by storage of information on hard disk storage media, the invention also relates to computer programs, particularly as stored on data carriers such as magnetic, optical, or magneto-optical storage media, or any other medium operable to put the invention into practice.

Alternatively, the carrier could be a hardware based program definition means, such as an integrated circuit, more specifically an application specific integrated circuit suitable to be introduced into a computer apparatus and operable to configure said apparatus to put the invention into practice.

The programs concerned may be in the form of source code, object code, or an intermediate format such as partially compiled code, or in any other form suitable to implement the invention.

Further, it will be appreciated that programs operable to put the invention into practice can be delivered to suitable computer apparatus from a remote location as carried on a signal carrier such as a telephone line, a wireless connection, a dedicated network connection, or a connection channel constructed of a combination of any of these means or any other suitable for carrying information signals defining programs to be used to put the invention into practice.

What is claimed:

1. A method for hedging an investment in an actively managed exchange traded fund comprising:
    sending, from a first computer, a set of instruments to be used as hedging instruments over a computer network to a second computer;
    calculating by the second computer a set of coefficients corresponding to the set of instruments, wherein a portfolio constructed by applying corresponding coefficients to each instrument has substantially the same levels of risk associated with risk factors as the levels of risk of the portfolio of securities held in the actively managed exchange traded fund associated with the risk factors;
    receiving output from the second computer comprising a corresponding coefficient for each instrument to be used as a hedging instrument; and
    constructing a hedging portfolio by applying the corresponding coefficient to each instrument to be used as a hedging instrument;
    wherein the hedging portfolio has substantially the same levels of risk associated with risk factors as the levels of risk of the portfolio of securities held in the actively managed exchange traded fund associated with the risk factors, and wherein the actual composition of the actively managed exchange traded fund is unknown to an investor who uses the hedging portfolio to hedge an investment in the actively managed exchange traded fund.

2. The method of claim 1, wherein the investor sends the set of instruments to be used as hedging instruments.

3. The method of claim 1, wherein the second computer is an independent third party computer.

4. The method of claim 1, wherein the investor is a trader, a market maker, or a specialist.

5. The method of claim 1, wherein a set of instruments held by the actively managed exchange traded fund is published.

6. A method for hedging an investment in an actively managed exchange traded fund comprising:
    calculating by a second computer data including a set of coefficients corresponding to a basket of instruments, wherein a portfolio constructed by applying corresponding coefficients to each instrument has substantially the same levels of risk associated with risk factors as the levels of risk of the portfolio of securities held in the actively managed exchange traded fund associated with the risk factors;
    outputting and sending by the second computer the set of coefficients to a first computer over the computer network;
    receiving output from the second computer comprising data indicative of the basket of instruments, wherein the basket of instruments has substantially the same levels of risk associated with risk factors as the levels of risk of the portfolio of securities held in the actively managed exchange traded fund associated with the risk factors;
    constructing by the first computer a hedging portfolio, by applying the corresponding coefficients to each instrument, in the basket of instruments, wherein the hedging portfolio having substantially the same levels of risk associated with the risk factors as the levels of risk of the basket of instruments associated with the risk factors; and
    receiving output from the first computer comprising the hedging portfolio; wherein
    the actual composition of the actively managed exchange traded fund is unknown to an investor who uses the hedging portfolio to hedge an investment in the actively managed exchange traded fund.

7. The method of claim 6, wherein the second computer is an independent third party computer.

8. The method of claim 6, wherein the second computer is an exchange computer.

9. The method of claim 6, wherein the investor is a trader, a market maker, or a specialist.

10. The method of claim 6, wherein a set of instruments held by the actively managed exchange traded fund is published.

11. A method for calculating a hedging portfolio for hedging an investment in an actively managed exchange traded fund, comprising:
    receiving, from a first computer over a computer network, a set of instruments to be used as hedging instruments to hedge an investment in the actively managed exchange traded fund;
    calculating by a second computer a set of coefficients corresponding to the set of instruments, wherein a portfolio constructed by applying corresponding coefficients to each instrument has substantially the same levels of risk associated with risk factors as the levels of risk of the portfolio of securities held in the actively managed exchange traded fund associated with the risk factors;

outputting and sending by the second computer the set of coefficients to the first computer over the computer network;

calculating by the first computer the portfolio constructed by applying corresponding coefficients to each instrument; and receiving output from the first computer comprising the portfolio constructed by applying the corresponding coefficients to each instrument;

wherein the actual composition of the actively managed exchange traded fund is unknown to an investor who uses the hedging portfolio to hedge hedging an investment in the actively managed exchange traded fund.

12. The method of claim 11, wherein a set of instruments held by the actively managed exchange traded fund is published.

13. The method of claim 11, wherein the first computer is a third party computer.

14. The method of claim 11, wherein the first computer is a fund manager computer or an administrator/custodian computer.

15. A method to allow hedging an investment in an actively managed exchange traded fund, comprising:

calculating by a first computer a set of coefficients corresponding to a set of instruments, wherein a portfolio constructed by applying corresponding coefficients to each instrument has substantially the same levels of risk associated with risk factors as the levels of risk of the portfolio of securities held in the actively managed exchange traded fund associated with the risk factors;

constructing by the first computer a portfolio by applying the corresponding coefficients to each instrument, in the set of instruments, wherein the portfolio having substantially the same levels of risk associated with the risk factors as the levels of risk of the set of instruments associated with the risk factors;

sending by the first computer, data indicating the portfolio constructed by applying the corresponding coefficients to each instrument on the first computer over a computer network to a second computer; and outputting the portfolio by the second computer;

wherein the actual composition of the actively managed exchange traded fund is unknown to an investor who uses the hedging portfolio to hedge hedging an investment in the actively managed exchange traded fund.

16. The method of claim 15, wherein the first computer is a fund manager computer or an administrator/custodian computer.

17. The method of claim 15, wherein the first computer is an exchange computer.

18. The method of claim 15, wherein the second computer is a trader, market maker, or specialist computer.

* * * * *